(12) United States Patent
Dubach

(10) Patent No.: US 9,386,850 B2
(45) Date of Patent: Jul. 12, 2016

(54) DRIVE DEVICE FOR MOVING A MOVABLE FURNITURE PART

(71) Applicant: Julius Blum GmbH, Hochst (AT)

(72) Inventor: Fredi Dubach, Baretwil (CH)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 13/679,016

(22) Filed: Nov. 16, 2012

(65) Prior Publication Data

US 2013/0140970 A1    Jun. 6, 2013

Related U.S. Application Data

(63) Continuation of application No. PCT/AT2011/000232, filed on May 19, 2011.

(30) Foreign Application Priority Data

May 20, 2010    (AT) .................................. A 828/2010

(51) Int. Cl.
     *A47B 88/04*      (2006.01)
     *F03G 1/00*      (2006.01)

(52) U.S. Cl.
     CPC ........... *A47B 88/047* (2013.01); *A47B 88/0477* (2013.01); *F03G 1/00* (2013.01)

(58) Field of Classification Search
     CPC ............. A47B 88/047; A47B 88/0477; A47B 88/0481; A47B 2088/047; F03G 1/00
     USPC ............ 312/330.1, 333, 334.1, 334.7, 334.8, 312/319.1, 319.2
     See application file for complete search history.

(56) References Cited

U.S. PATENT DOCUMENTS

| | | | |
|---|---|---|---|
| 7,431,410 B2 | 10/2008 | Sato et al. | |
| 2006/0017358 A1* | 1/2006 | Sato et al. | 312/333 |
| 2007/0222346 A1 | 9/2007 | Kleinsasser | |
| 2008/0191592 A1 | 8/2008 | Dubach | |
| 2009/0072687 A1* | 3/2009 | Fitz | 312/319.5 |
| 2011/0254416 A1 | 10/2011 | Salice | |

FOREIGN PATENT DOCUMENTS

| | | |
|---|---|---|
| CN | 101068487 | 11/2007 |
| DE | 10 2004 037 120 | 3/2006 |
| DE | 20 2009 005 009 | 4/2010 |
| JP | 8-117044 | 5/1996 |

(Continued)

OTHER PUBLICATIONS

International Search Report issued Nov. 2, 2011 in International (PCT) Application No. PCT/AT2011/000232.

(Continued)

*Primary Examiner* — James O Hansen
(74) *Attorney, Agent, or Firm* — Wenderoth, Lind & Ponack, L.L.P.

(57) ABSTRACT

The invention relates to a drive device for moving a movable furniture part, in particular a drawer, said drive device acting as a latching and unlatching spring-loaded ejection device for ejecting the furniture part from a closed position in the opening direction and as a spring-loaded refraction device for retracting the furniture part into the closed position. The same spring spring-loads the drive device both when the latter acts as an ejection device and when the drive device acts as a refraction device.

39 Claims, 40 Drawing Sheets

(56) References Cited

FOREIGN PATENT DOCUMENTS

| | | |
|---|---|---|
| JP | 2006-26332 | 2/2006 |
| JP | 2009-89808 | 4/2009 |
| JP | 2009-165764 | 7/2009 |
| WO | 2007/028177 | 3/2007 |
| WO | 2007/116572 | 10/2007 |
| WO | 2009/109536 | 9/2009 |
| WO | 2010/043306 | 4/2010 |

OTHER PUBLICATIONS

Austrian Patent Office Search Report completed Jan. 31, 2011 in Austrian Patent Application No. A 828/2010.

* cited by examiner

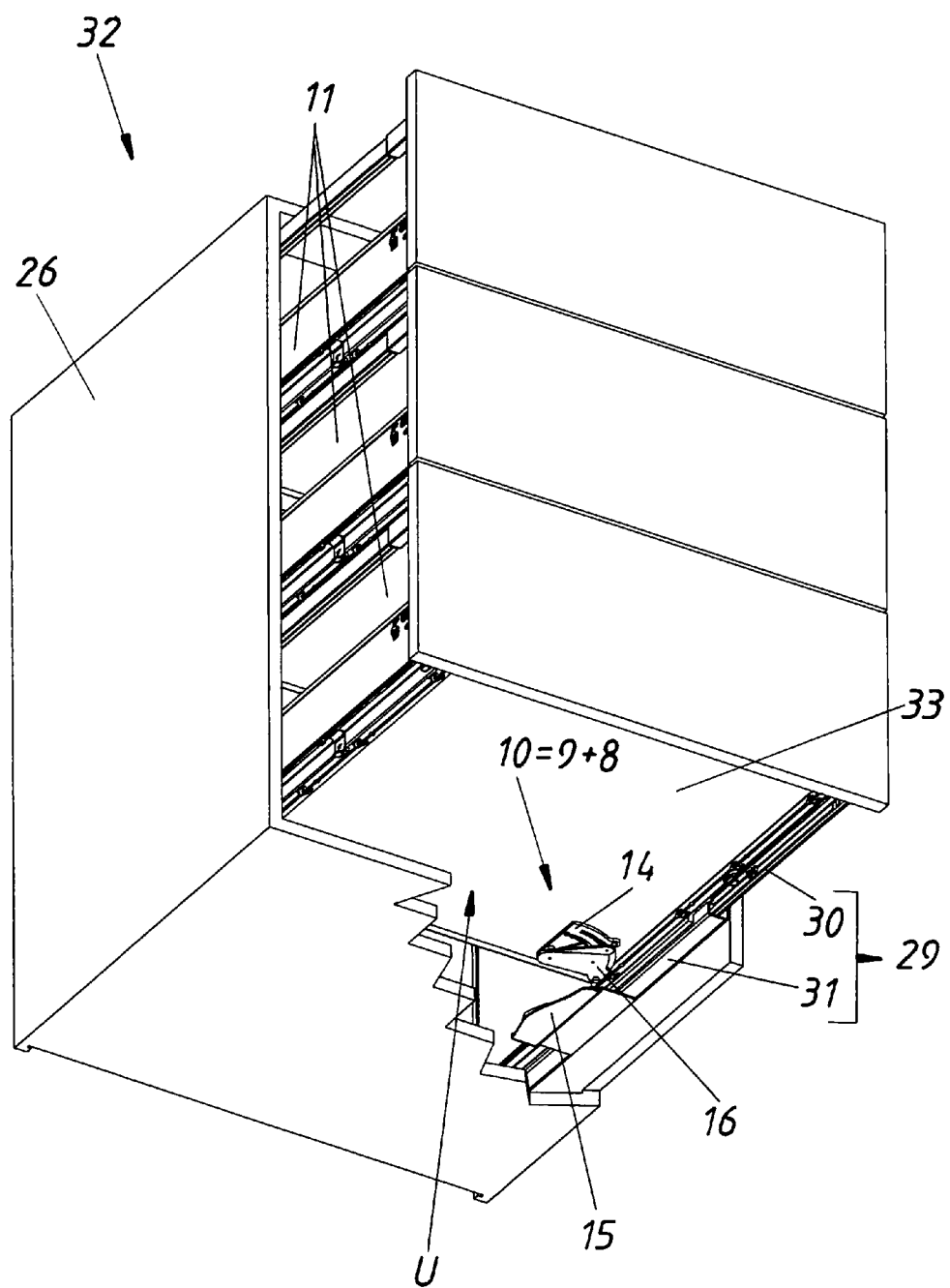

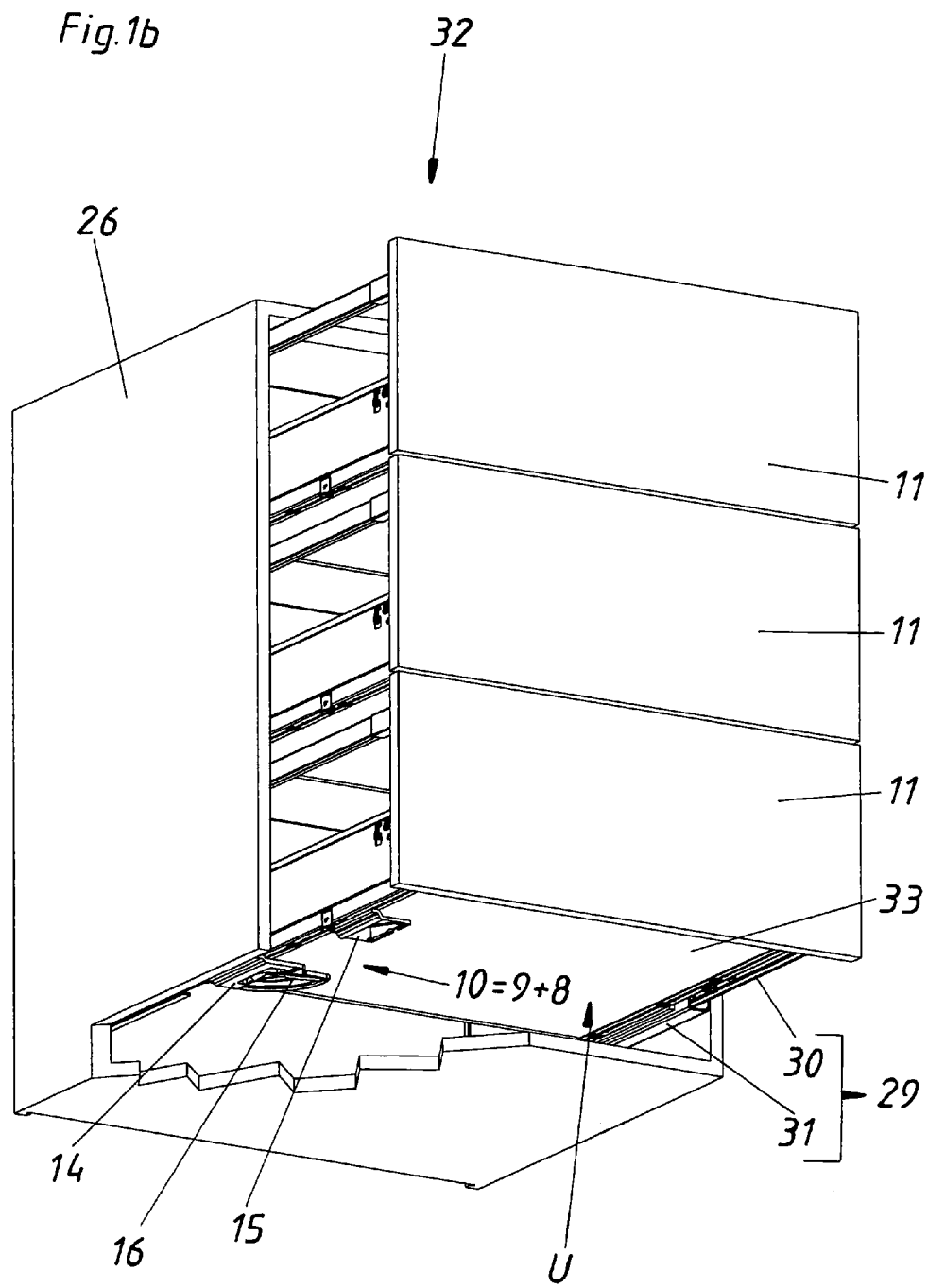

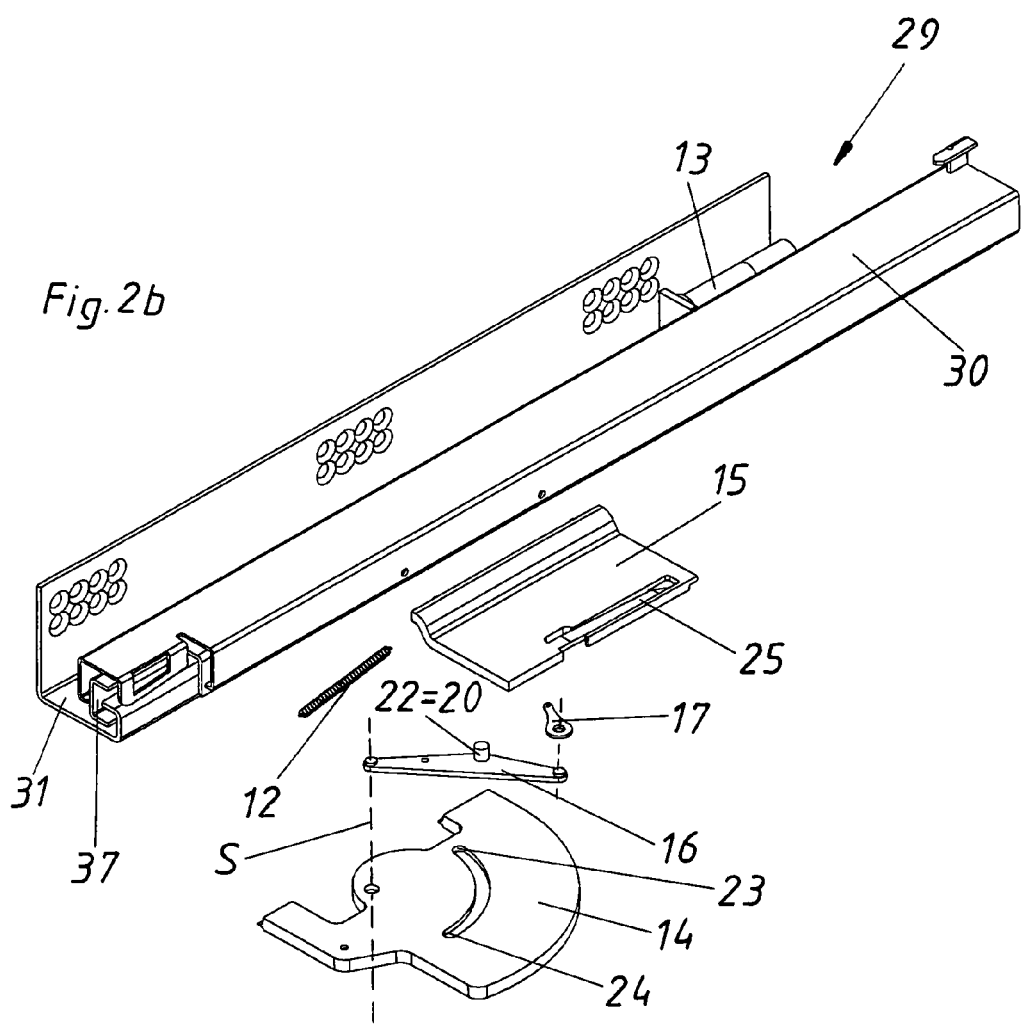

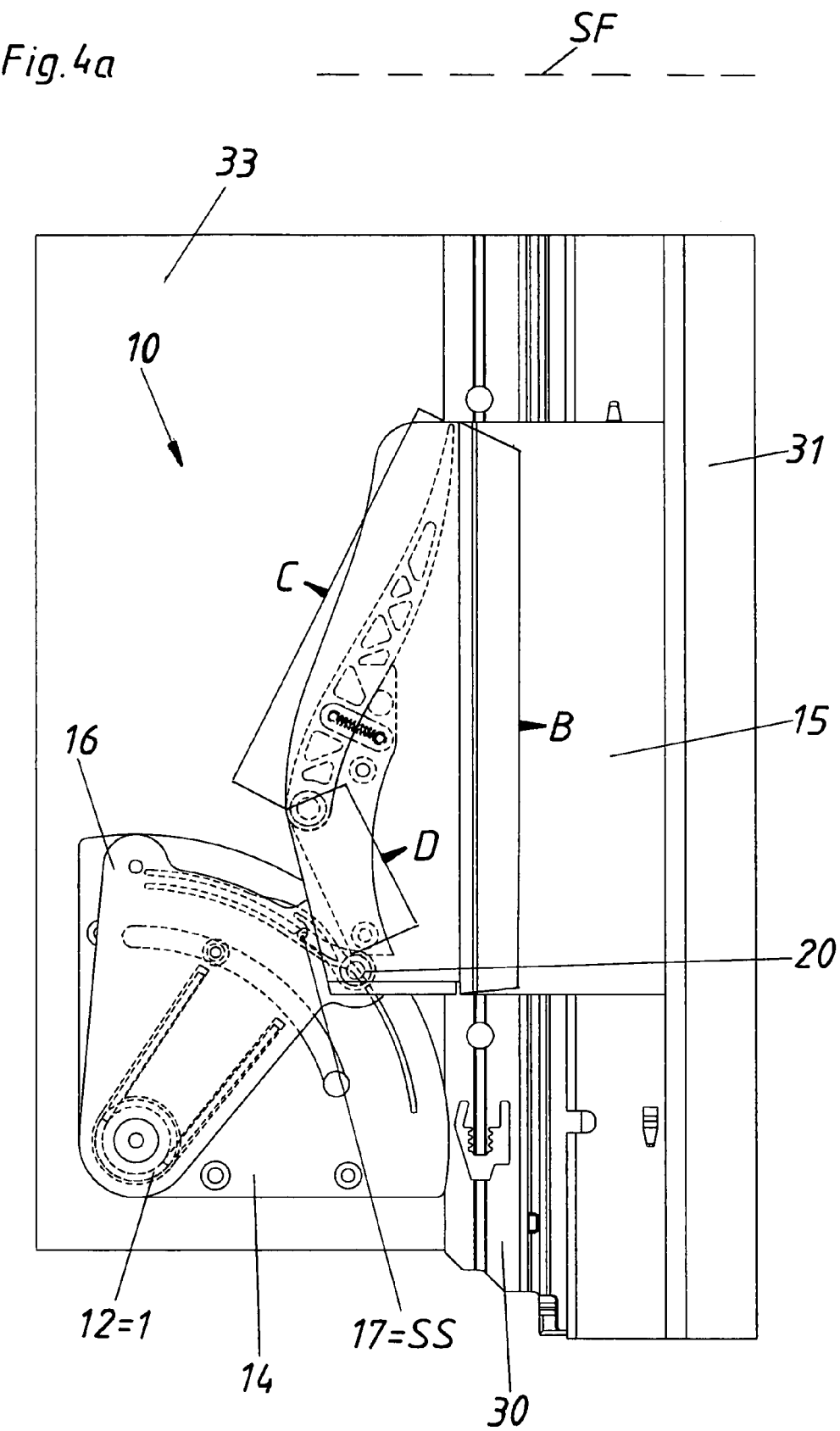

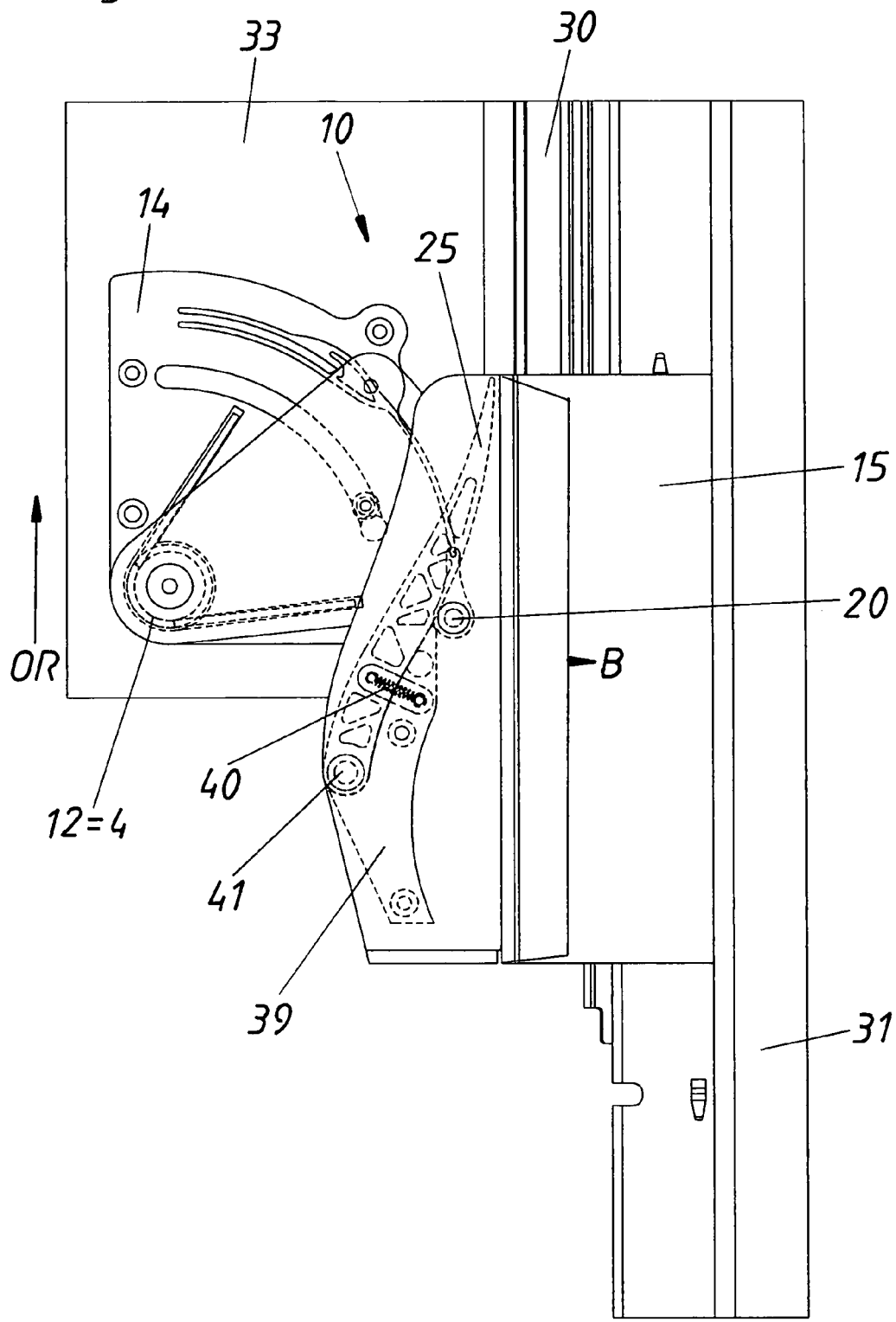

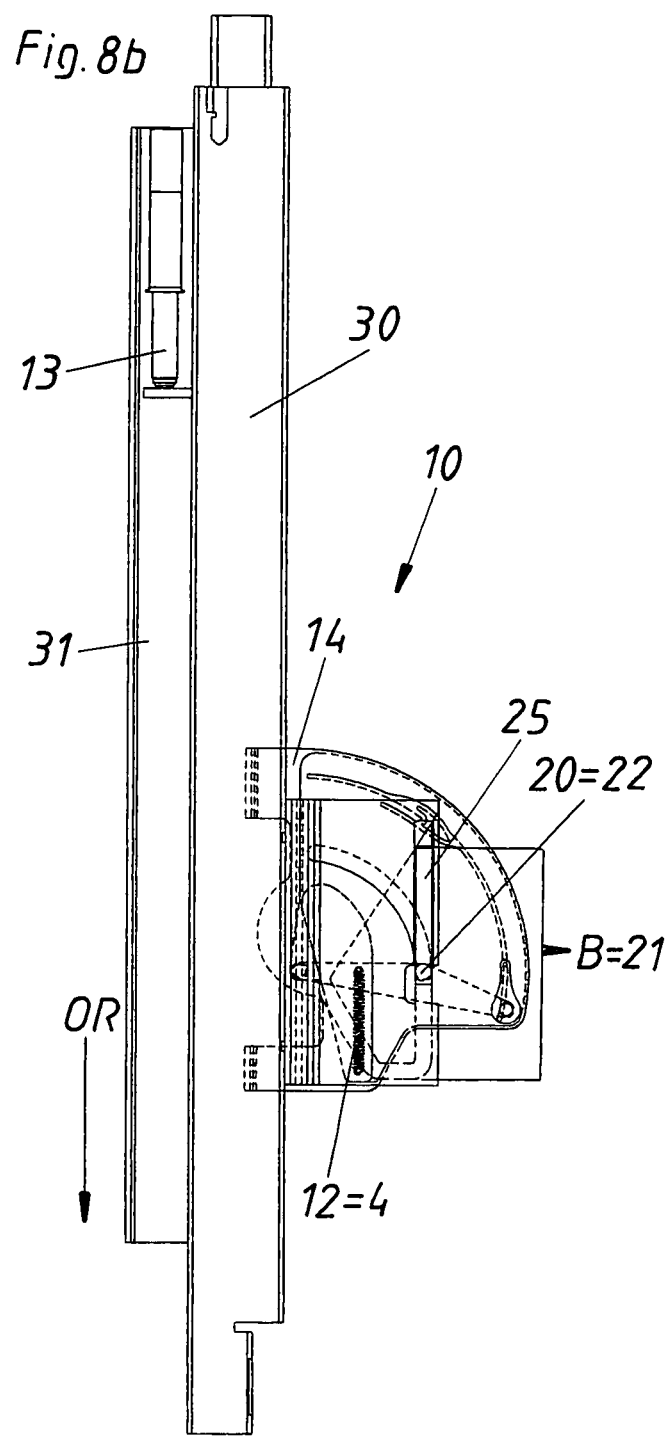

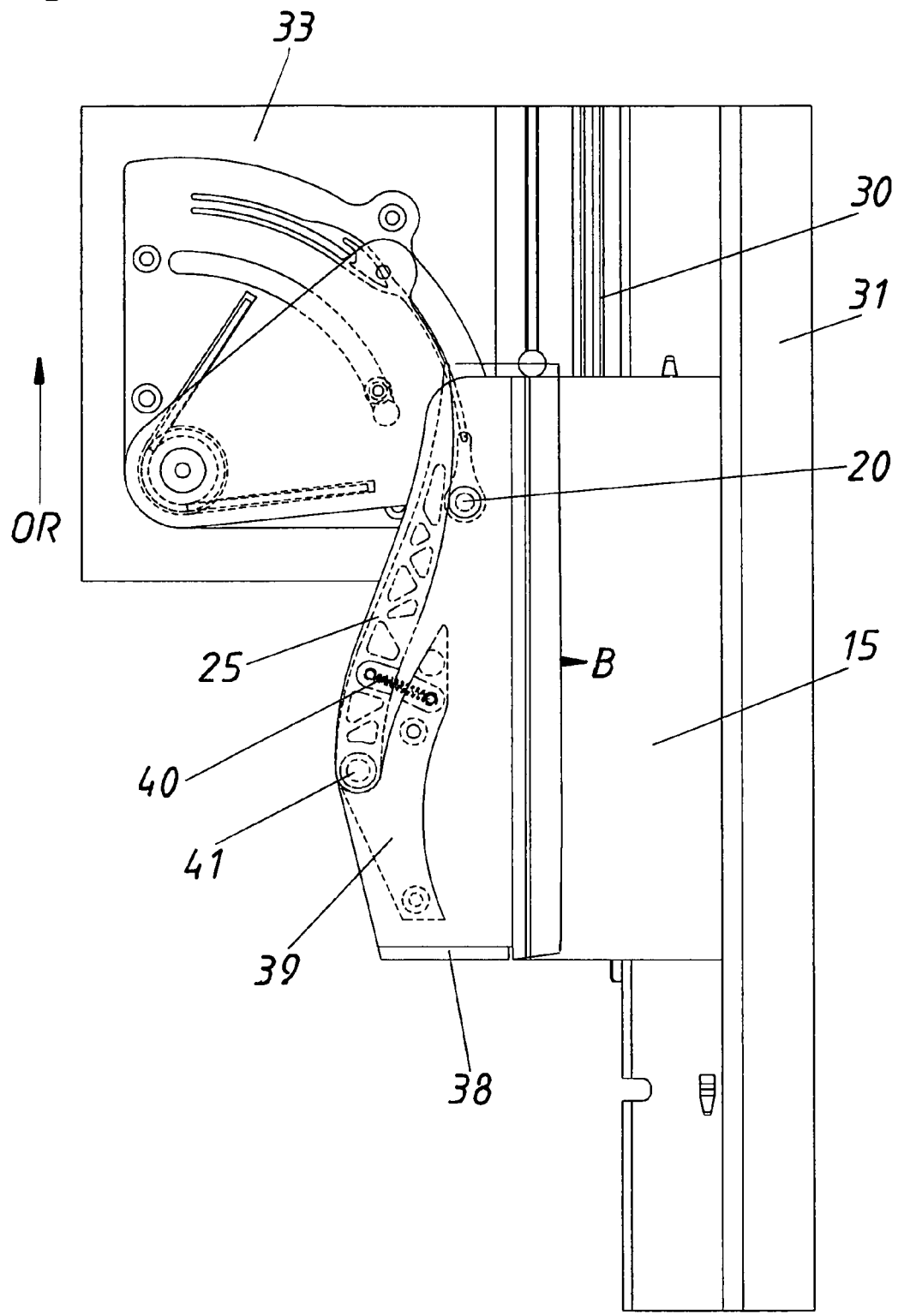

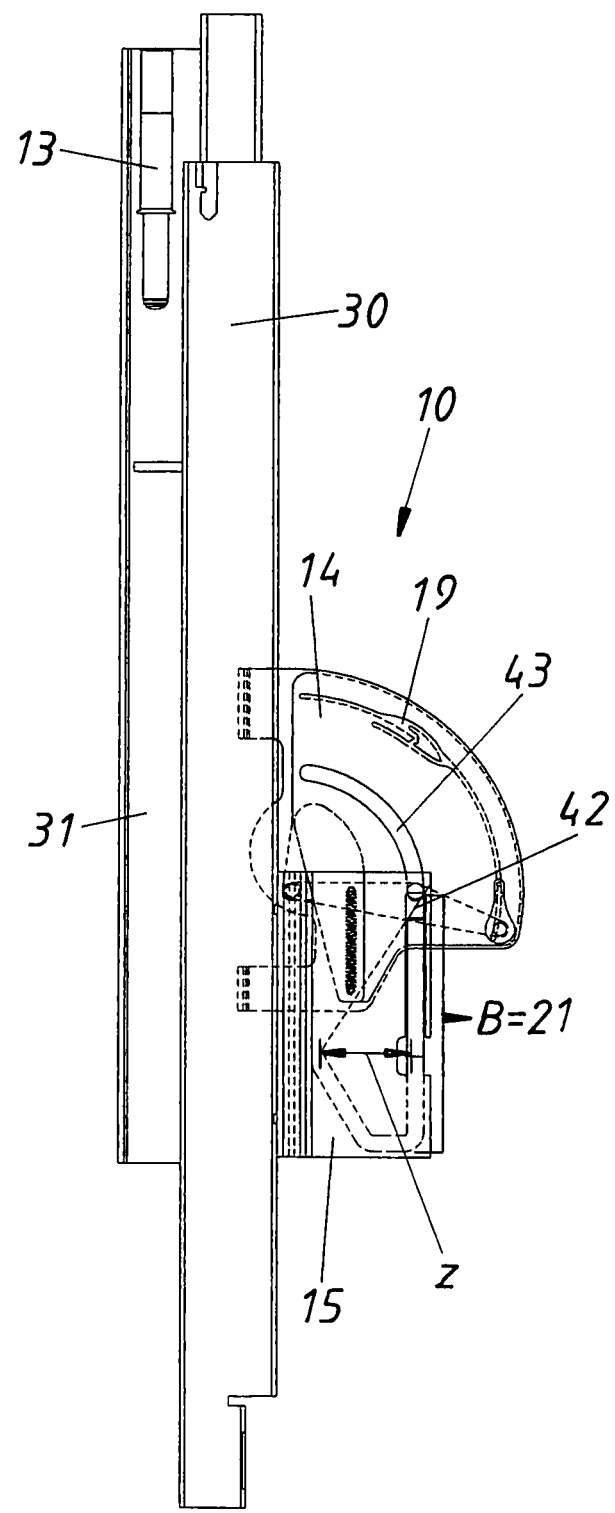

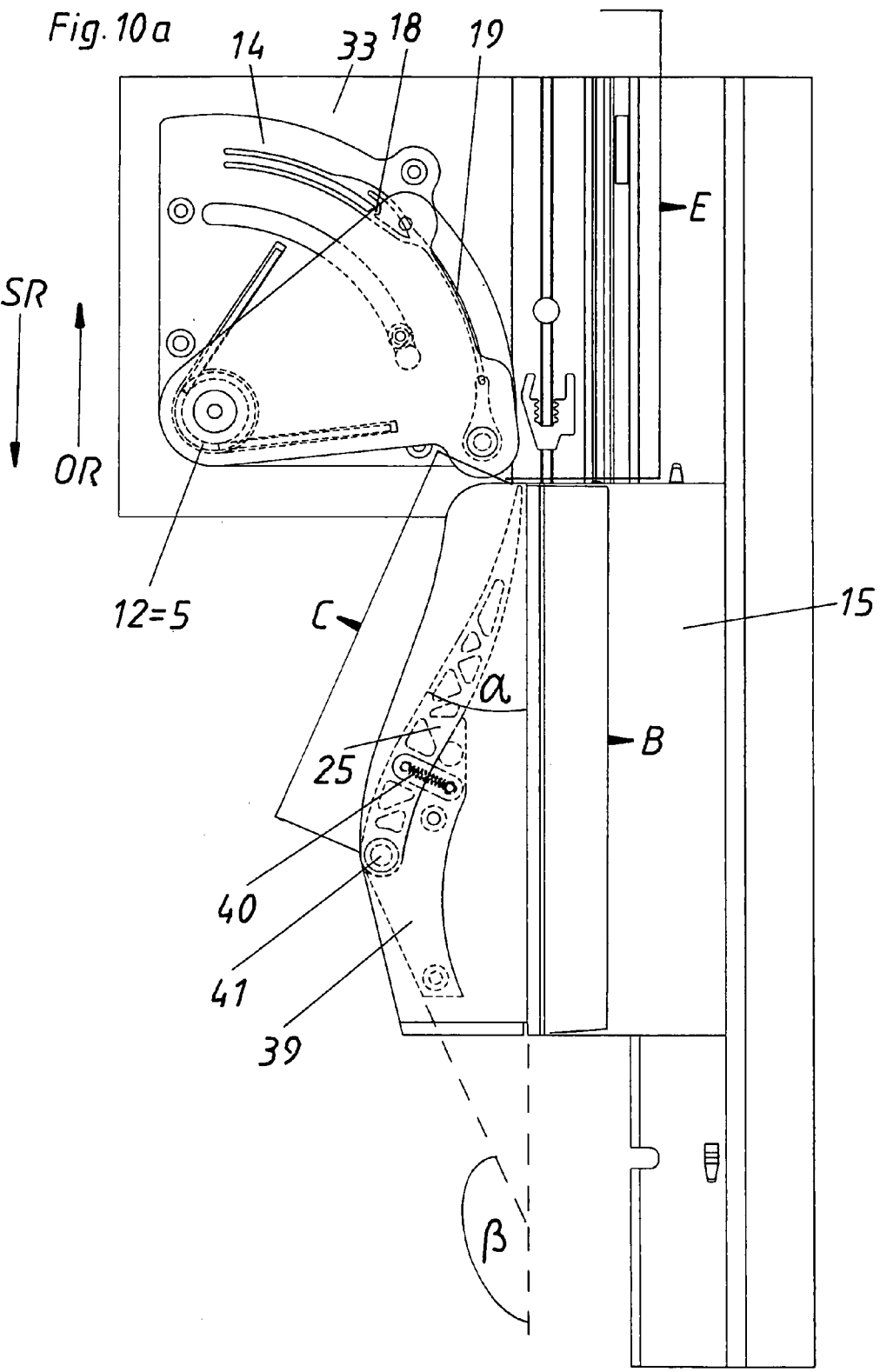

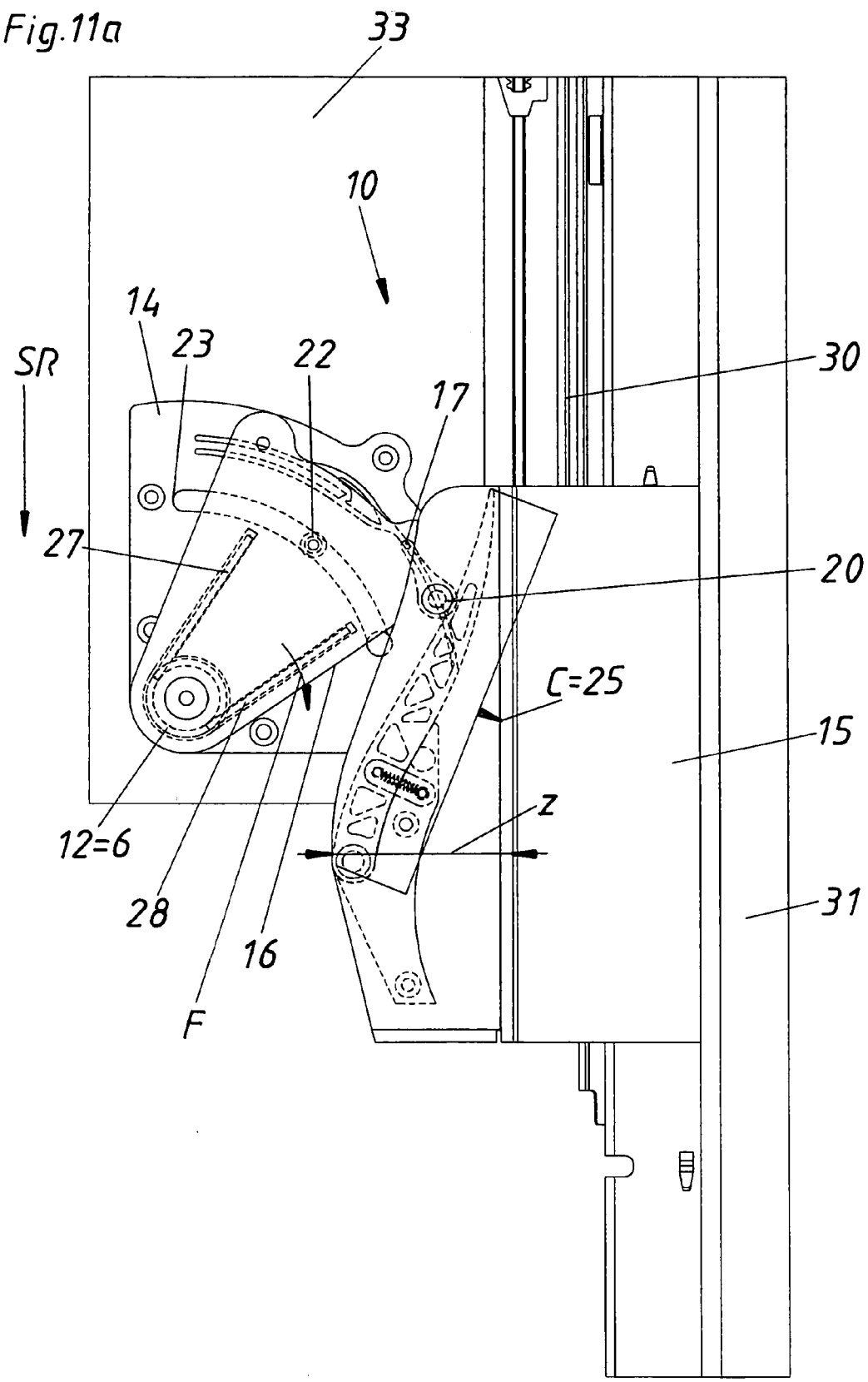

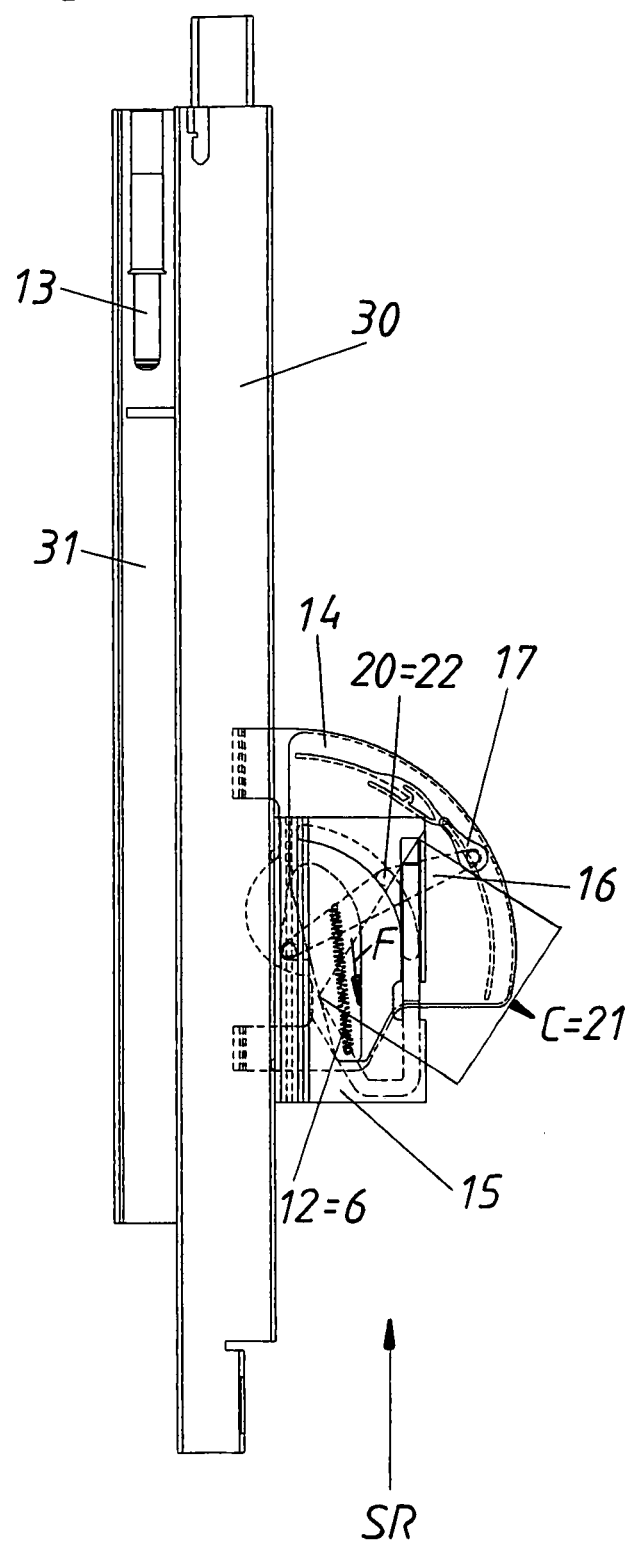

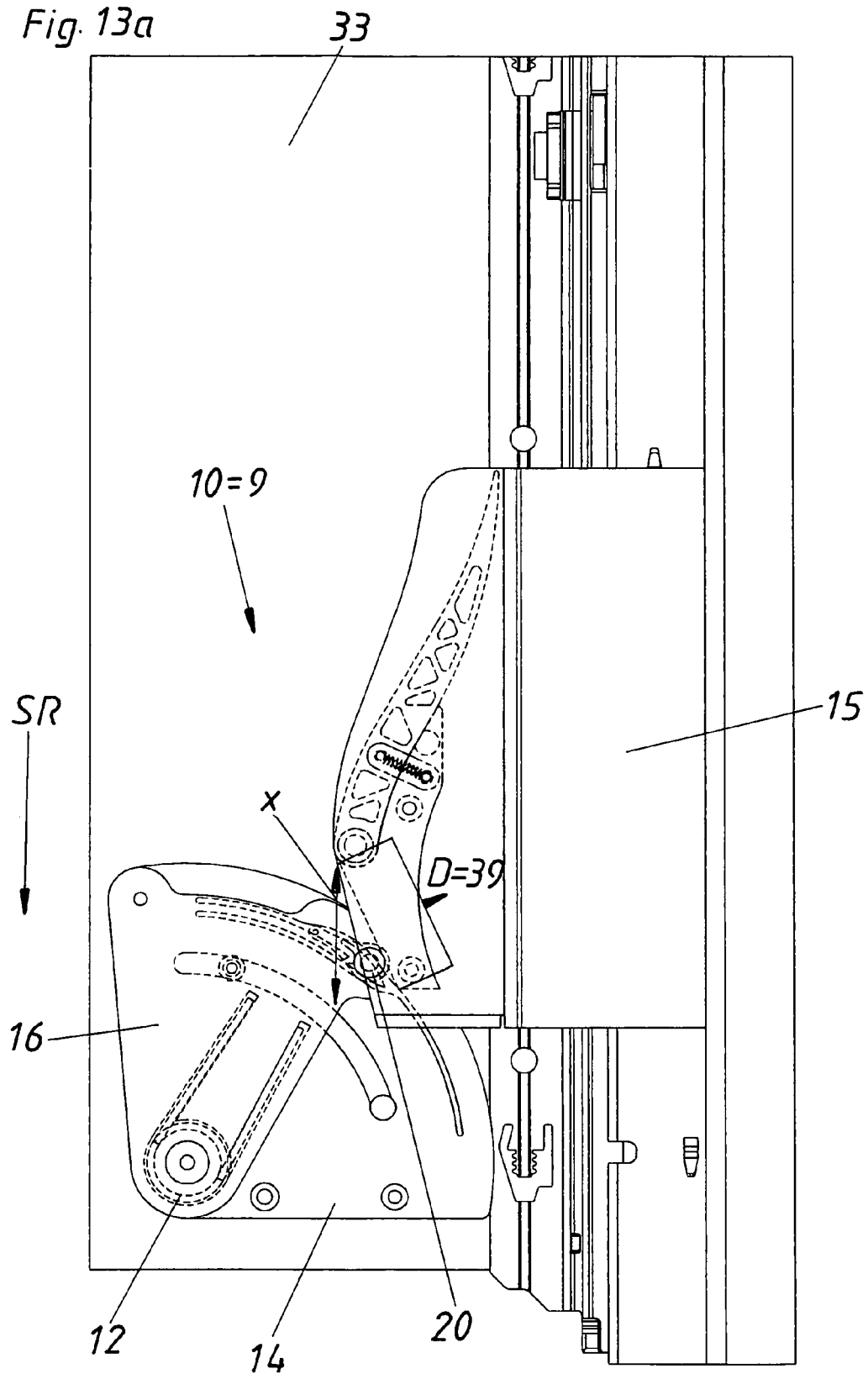

Fig. 14
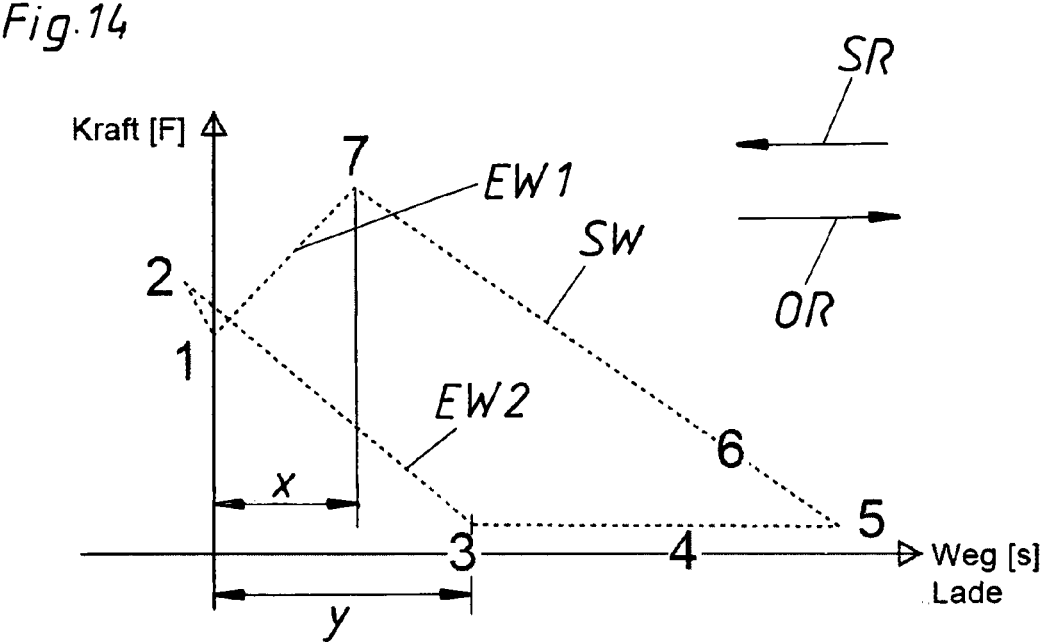
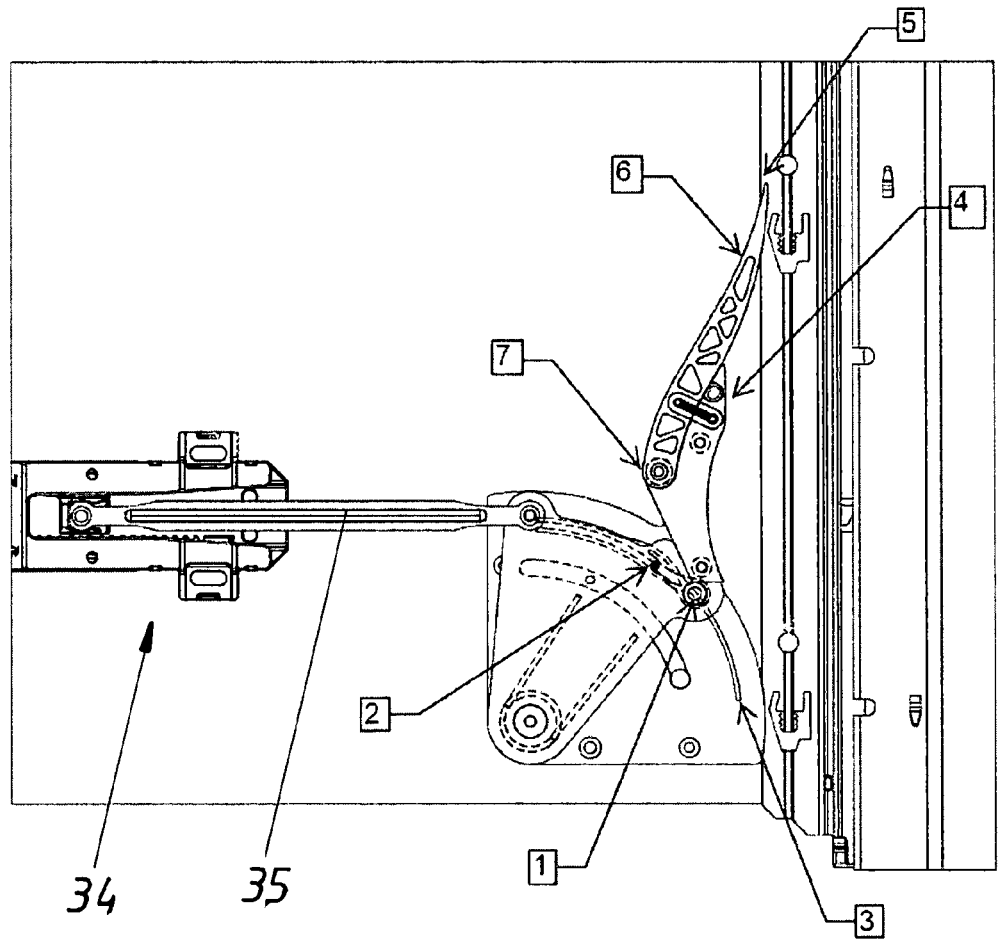

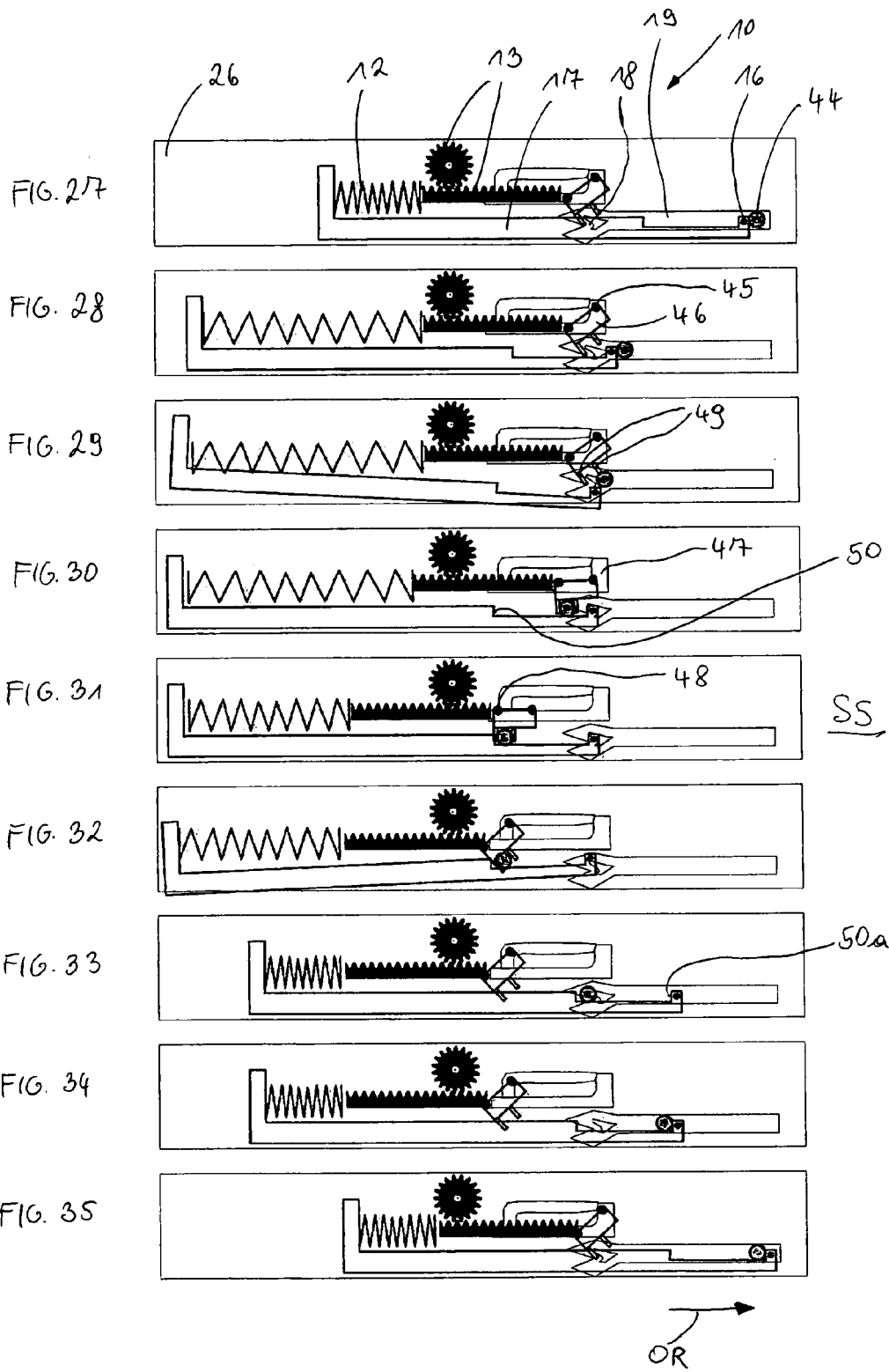

DRIVE DEVICE FOR MOVING A MOVABLE FURNITURE PART

The invention concerns a drive device for moving a movable furniture part, in particular a drawer. The invention further concerns a drawer extension guide having such a drive device and an article of furniture having such a drive device.

So-called touch-latch mechanisms for movable furniture parts such as drawers, drop doors and so forth have already been known from the state of the art for some time. They involve automatic opening of the movable furniture part after pressure is applied to the movable furniture part in the closing direction by a user. Separate switches which perform such an opening movement are sometimes also provided. That extra pressure applied to the movable furniture part triggers the ejection device, whereupon the movable furniture part is ejected from the furniture carcass in the opening direction by a force storage means being released. In most cases corresponding ejection devices are disposed beneath the drawer bottom or behind the drawer.

Mechanisms which facilitate or improve closing of a movable furniture part have also been known from the state of the art for some time. In that respect there are various versions of retraction devices by which a movable furniture part is automatically pulled in over the last region of the closing movement (generally a few centimeters) so as to guarantee that the drawer or the movable furniture part is securely closed.

An example of a publication showing both an ejection device and also a retraction device is WO 2007/028177 A1 to the present applicant. Two Figures originating from that specification are shown in the present specification as FIGS. 15 and 16. They show on the one hand an ejection device 8 as a structural unit. Shown as a second separate structural unit between the drawer rail 30 and the carcass rail 31 is a retraction device 9 which performs the closing movement of the drawer rail 30 relative to the carcass rail 31 in the closing direction SR. In that case the retraction device 9 must have its own spring, its own housing and all further entrainment members and so forth integrated therein so that the retraction operation can be satisfactorily implemented. In addition that specification shows a damping device 13 for the retraction device 9.

A disadvantage with that known construction is that two separate, independent and costly structural units have to be provided in the region of an extension guide in order thereby to be able to perform on the one hand ejection and on the other hand retraction. In addition, in the state of the art, it is often relatively complicated to provide for stressing of the springs without a user noticing that as a difficulty when producing the movement upon opening or closing.

The object of the invention is to provide a drive device which is improved over the state of the art. In particular the invention seeks to provide that the ejection device and the retraction device are combined as much as possible into one structural unit so that fewer components are required.

That object is attained in conjunction with the features of the classifying portion of an aspect of the invention, in that the drive device acts on the one hand as a lockable and unlockable spring-loaded ejection device for ejecting the furniture part from a closed position in the opening direction, and on the other hand as a spring-loaded retraction device for retracting the furniture part into the closed position, wherein the same spring spring-loads the drive device both in its function as an ejection device and also in its function as a retraction device. By virtue of such a design configuration the spring provides both for acting to produce the ejection movement of the ejection device and also acting to produce the retraction movement of the retraction device. In that respect the spring can be in the form of a compression or a tension spring. In that respect the term spring also embraces force storage means in the form of gas ressure springs. Basically the spring can also be in the form of a magnetic spring.

To implement a stressing process that is as simple as possible for the ejection device and the retraction device, it can preferably be provided that the spring can be stressed along a stressing travel upon opening or closing of the movable furniture part and has a relief travel, wherein the spring retracts the movable furniture part in a first part of the relief travel and ejects the movable furniture part in a second part of the relief travel. With that arrangement it is no longer necessary—as in the state of the art—to find a possible way of providing two matching stressing travels for the spring of the retraction device and for the separate spring of the ejection device.

In the present invention therefore the precise arrangement and configuration of the invention can be per se any desired arrangement and configuration as long as stressing of the spring necessitates only one stressing travel of which the stress relief energy can be used in regard to one part for retraction and in regard to the other part for ejection.

It is preferably provided however that the spring is in the form of a single spring. That affords substantial simplification and a reduction in the space required. As an alternative option however the possibility of the spring being in the form of a spring pack should not be excluded. That permits different adaptations so that a part of the spring pack deploys its stress relief action to a particularly great degree for example upon ejection while a further part of the spring pack which is preferably simultaneously loaded causes the stress relief energy to act in the closing direction of the movable furniture part relatively slowly and gently during the retraction movement. It is essential that the springs of the spring pack are stressed during a common stressing operation, in which respect however the beginning and the end of the stressing of the individual springs or the parts of the spring pack can differ. It can preferably be provided that the individual springs of the spring pack are connected in mutually parallel relationship.

To permit the spring that double function with so-to-speak oppositely directed retraction and ejection movements, it can preferably be provided that the spring in the closed position of the furniture part has a first medium spring stress, after ejection of the furniture part the spring has a second, substantially relieved spring stress at a given ejection spacing after leaving the closed position, upon closure of the furniture part at a given retraction spacing before reaching the closed position the spring reaches a third spring stress which is increased in relation to the first, and starting from the third spring stress with stress relief and automatic retraction of the furniture part the spring is relieved to the first spring stress. In that way an ejection travel (second relief travel) in which the furniture part can be ejected is available to the spring, from the medium spring stress. Upon retraction the spring is stressed to a spring stress which is above the medium spring stress (stressing travel), whereupon in the last closing portion the furniture part is automatically pulled in by the spring being relieved of stress from the highest spring stress to the medium spring stress (first relief travel).

It can particularly preferably be provided that the retraction spacing is less than the ejection spacing. That provides that retraction takes place during a relatively short travel distance while the ejection travel is relatively long so that ejection does not occur excessively abruptly.

It can further particularly preferably be provided that the stressing travel is longer than the second part of the relief travel. That is the case in particular when the stressing angle is relatively shallow, whereby the spring is stressed easily and almost unnoticed by the user.

As upon unlocking of the movable furniture part or applying increased pressure thereto, the movable furniture part is further moved in the closing direction for a short time before the closed position, it can preferably be provided that the spring has a fourth spring stress which is slightly increased in relation to the third, upon unlocking of the ejection device.

To make the retraction movement gentler and softer there is preferably provided a damping device for damping the retraction movement of the retraction device. As the damping device acts in the opening direction of the furniture part the retraction force and the locking force should exceed the force of the damping device, that is acting in the opposite direction. The damping device guarantees that the retraction process does not take place excessively abruptly and loudly but gently and quietly.

To permit use of a single spring both for the ejection device and also for the retraction device in a structurally simple fashion it can preferably be provided that the drive device has a first base element and a second base element which are movable relative to each other in the opening direction and the closing direction respectively of the movable furniture part, a control element which is mounted movably, preferably pivotably, on the first base element, the spring which acts on the control element, and a locking element connected to the control element, wherein the control element is guided with the locking element in a preferably cardioid-shaped portion of a locking and unlocking path and a drive element for the second base element is arranged on the control element, wherein the second base element has a guide path for the drive element and said guide path has an ejection portion in which the second base element is movable relative to the first base element in the opening direction of the movable furniture part by the drive element, has a free-running portion in which the drive element is freely movable in the opening direction, has a stressing portion in which the drive element is movable in opposition to the spring force of the spring acting on the control element, and has a retraction portion in which the drive element moves the second base element relative to the first base element in the closing direction of the movable furniture part with partial stress relief of the spring, wherein the ejection portion of the guide path, with the control element, the locking element and the drive element and the spring forms the lockable and unlockable ejection device and the retraction portion of the guide path with the control element, the drive element and the same spring forms the retraction device.

In other words the spring acts on a control element which controls the ejection movement and the retraction movement of a movable furniture part in relation to the furniture carcass. In that respect the first and second base elements respectively represent the furniture carcass and the movable furniture part, wherein the first base element can be mounted to the movable furniture part and the second base element can be mounted to the furniture carcass and vice-versa. In addition it is important in that respect that provided in the region of the second base element is a guide path with which the control element cooperates by way of a drive element. The most important portions in such a guide path are the ejection portion, the stressing portion and the retraction portion.

In a particularly preferred embodiment of the invention it can be provided that the spring is relieved in the ejection portion from the medium spring stress to the second spring stress, the relieved spring stress remains substantially the same in the free-running portion, the spring is stressed from the relieved spring stress to the increased spring stress in the stressing portion, and the spring is relieved from the increased spring stress to the first spring stress in the retraction portion. This therefore clearly shows the logical connection between the individual spring stresses and the guide path portions.

In a preferred embodiment of the invention it can be provided that the control element is mounted pivotably to the first base element. Alternatively the control element could also be mounted linearly movably. To limit the movement of that control element it can preferably be provided that the control element has a limiting projection which limits the movement of the control element between two abutments which are preferably in the first base element. In that way the control element can be moved between two abutments with stressing and stress relief of the spring.

If the locking and unlocking mechanism of the ejection device is also to be completely integrated into the drive device, then the locking and unlocking path for the locking element, which path has a cardioid-shaped portion, should be provided in the first base portion.

In regard to stressing of the spring it can be provided on the one hand that the guide path in the stressing portion moves the drive element upon closure of the movable furniture part in opposite relationship to the spring force of the spring. On the other hand the drive element could already pass into a stressing portion for stressing the spring upon opening or ejection of the movable furniture part.

As the entire drive device should be relatively compact it is necessary for the first base element and the second base element also to be able to move freely without influencing each other. That is particularly desirable between the approximately half open position of the drawer and complete opening of the drawer. In order however in that respect to guarantee that the drive element does not pass into the wrong guide path when leaving the region with the guide portions and when passing again into the region with the guide portions, it can preferably be provided that the second base element has a preferably spring-loaded movement switch which allows the opening movement of the drive element from the free-running portion into a further completely free free-running portion and which guides the drive element from the further free-running portion into the stressing portion in the closing movement. For that purpose it is possible to provide for example an inclined deflection means or a movement switching spring.

To be able to connect the control element on the one hand to the guide path for retraction and ejection and on the other hand to the locking and unlocking path for the locking element and to be able to coordinate same a preferred embodiment provides that the locking element is mounted pivotably to the control element.

For an optimum stressing operation and retraction operation in respect of the spring it can preferably be provided that the ejection portion extends substantially transversely relative to the opening direction, the free-running portion extends substantially in the opening direction, the stressing portion has at least region-wise an angle between 5° and 70°, preferably between 15° and 50°, relative to the opening direction, and the retraction portion has at least region-wise an angle between 130° and 175°, preferably between 140° and 165°, relative to the opening direction. For that purpose it can further be provided that at least one of the portions of the guide path extends at least partially in a curve. The precise configuration of those stressing and relief paths can lead to a soft and gentle, fast and/or easily implementable manual movement of the movable furniture part, in which case—without the user noticing it—all spring stressing processes are implemented by the manual movement on the part of the user. Accordingly: the smaller or shallower the angle of the stressing portion, the correspondingly easier can the stressing operation be performed.

Particularly preferably the curved shape of the stressing portions can be such that the transition between the stressing portion and the retraction portion corresponds to the retraction spacing and there the spring reaches the highest spring stress. In that case the stressing portion and the retraction portion form so-to-speak a hill, at the highest point of which the spring is most heavily stressed and the spring is relieved of stress after passing beyond that point and in that case retracts the movable furniture part by pressing the drive element against the retraction portion. In other words that hill shape can be described by the stressing portion and the retraction portion being spaced from the free-running portion in transverse relationship to the opening direction, wherein the greatest spacing of both portions with respect to the free-running portion is at the given retraction spacing.

There are essentially two possible design configurations for the present invention. The first design configuration provides that the first base element is associated with the movable furniture part and the second base element is associated with a furniture carcass on or in which the furniture part is movably mounted. In that embodiment it is preferably provided that the locking element is formed integrally with the drive element. Accordingly that preferably integral component is displaced on the one hand in the locking and unlocking path and on the other hand in the individual portions of the guide path for the drive element. In addition in that respect it can preferably be provided that the spring is in the form of a leg spring, wherein one leg acts on the first base element and one leg acts on the control element.

The second possible design configuration of the present invention provides that the first base element is associated with a furniture carcass and the second base element is associated with the movable furniture part. In this embodiment it can preferably be provided that the limiting projection forms the drive element. In that way the limiting projection is additionally used to apply the spring force of the control element by way of the drive element or the limiting projection to the ejection portion and thus to eject the furniture part.

Protection is claimed for a drawer extension guide for a movable furniture part in the form of a drawer, having a drive device according to the invention. In that respect it can preferably be provided that the second embodiment of the present drive device is arranged on or fixed to the drawer extension guide. In that arrangement the drawer extension guide can have a drawer rail and a carcass rail, wherein the first base element is arranged on the carcass rail and the second base element is arranged on the drawer rail.

Protection is further claimed for an article of furniture comprising a furniture carcass and a movable furniture part, wherein the furniture part can be retracted and ejected by a drive device according to the invention.

In the first embodiment of the drive device described herein it can be provided in that respect that the first base element is arranged on the movable furniture part, preferably at the underside of a drawer bottom, and the second base element is arranged on the furniture carcass, preferably on a carcass rail of a drawer extension guide, that is fixed to the furniture carcass.

If the drive device is in the form of the second embodiment then the first base element is arranged on the furniture carcass, preferably a carcass rail of a drawer extension guide, that is fixed to the furniture carcass, and the second base element is arranged on the movable furniture part, preferably on a drawer rail of the drawer extension guide, that is associated with the furniture part.

BRIEF DESCRIPTION OF THE DRAWINGS

Further details and advantages of the present invention are described more fully hereinafter by means of the specific description with reference to the embodiments by way of example shown in the drawings, wherein FIGS. 1a through 13a show various views of the first embodiment of a drive device from below and FIGS. 1b through 13b show in the same sequence views of the second embodiment of a drive device from above. In detail:

FIGS. 1a+1b show a view of an article of furniture with a drive device mounted to the underside of a movable furniture part, FIGS. 2a+2b show an exploded view of a drawer extension guide and the drive device, FIGS. 3a+3b show the extension guide with drive device in the assembled condition, FIG. 14 shows a force-travel diagram of the spring and the drawer with the corresponding positions along the guide path.

DETAILED DESCRIPTION OF THE INVENTION

Figure 2A:
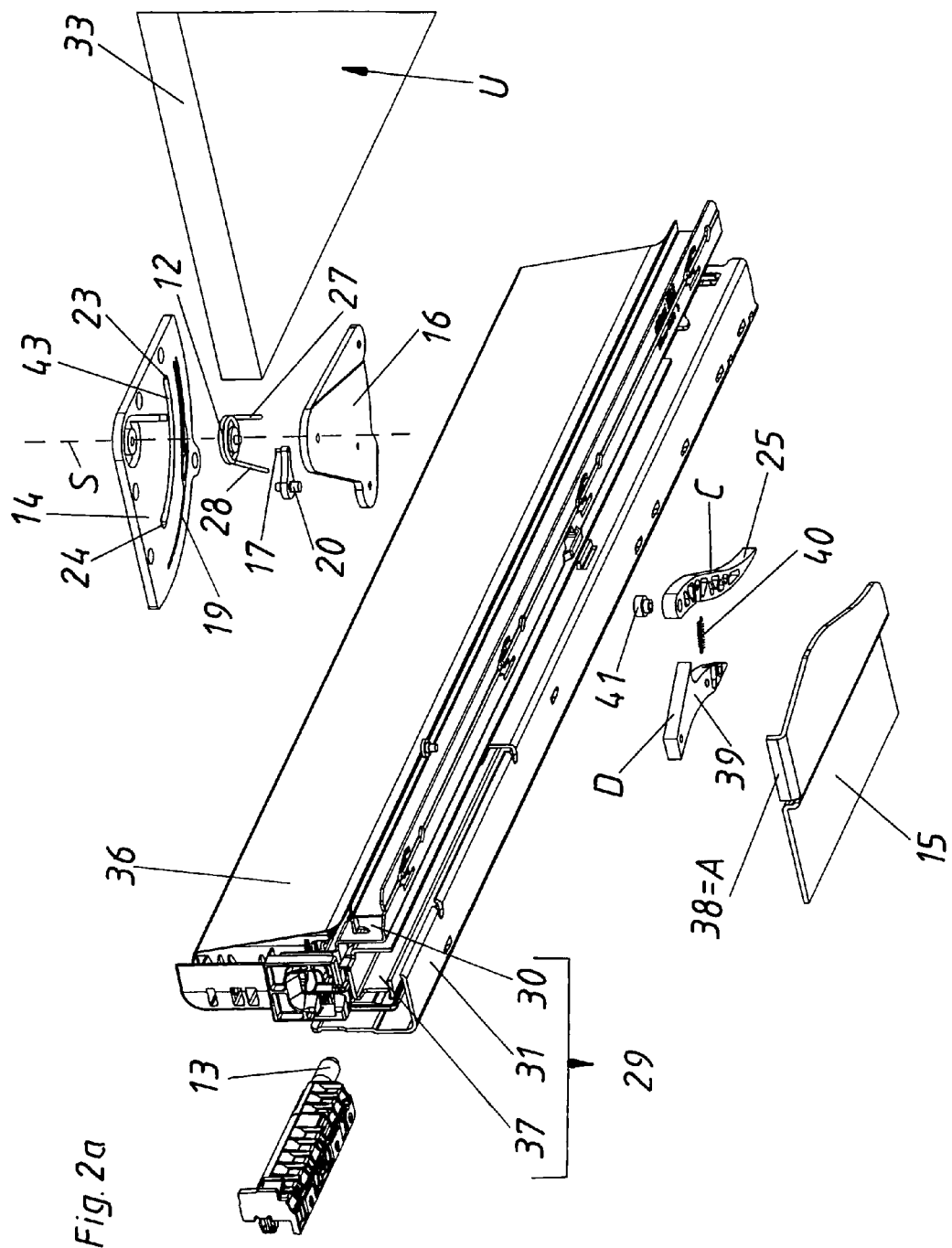

FIG. 1a shows a partly broken-away 3-D view of an article of furniture 32 from below. In this case this article of furniture 32 has a furniture carcass 26 and three movable furniture parts 11 in the form of drawers. Those movable furniture parts 11 are mounted movably in drawer extension guides 29 fixed to the furniture carcass 26, and its drawer rails 30 and carcass rails 31. In this case arranged at the underside U of the drawer bottom 33 is a drive device 10 which is both in the form of an ejection device 8 and also a retraction device 9 for the movable furniture part 11. That drive device 10 comprises a first base element 14 arranged on the movable furniture part 11 and a second base element 15 arranged on the furniture carcass 26 or the carcass rail 31. A control element 16 acts between those two elements 14 and 15. That control element 16—particularly appropriately in the case of wide drawers—can be connected by way of a synchronization bar 35 and a synchronization device 34 (see FIG. 14) to a second drive device (not shown) at the other side of the movable furniture part 11 to provide for synchronization of the retraction movement and the ejection movement at both sides.

FIG. 2*a* shows a drawer side frame member 36 connected to the drawer extension guide 29 comprising the carcass rail 31, the central rail 37 and the drawer rail 30. To damp the closing movement of the drawer rail 30 relative to the carcass rail 31 a damping device 13 can be integrated in the drawer extension guide 29. Shown in the lower region is the second base element 15 which forms an upwardly curved ejection abutment 38 forming the ejection portion A. That second base element 15 is mounted to the carcass rail 31. Fixed on that second base element 15 is the retraction guide element 39 having the retraction portion D. A movement switch 25 is connected rotatably to that retraction guide element 39 by way of a pivot axis member 41 and is acted upon by a movement switch spring 40. The curved stressing portion C is provided on the movement switch 25 itself.

Shown in the upper region of FIG. 2*a* is the first base element 14 mounted to the underside U of the drawer bottom 33. Provided at the underside of that first base element 14 is a pivotal path 43 having end abutments 23 and 24 between which the control element 16 is pivotable by way of a limiting projection 22 (not shown here). Arranged between the first base element 14 and the control element 16 is a leg spring 12 having the legs 27 and 28, the spring 12 acting on the base element 14 and the control element 16. Mounted pivotably on the control element 16 is an integral component which has on the one hand the drive element 20 and on the other hand the locking element 17, wherein that locking element 17 is displaceable in the locking and unlocking path 19 in the first base element 14. The drive element 20 in turn engages through the control element 16 and bears against the corresponding portions A, C and D of the second base element 15.

Figure 3A:
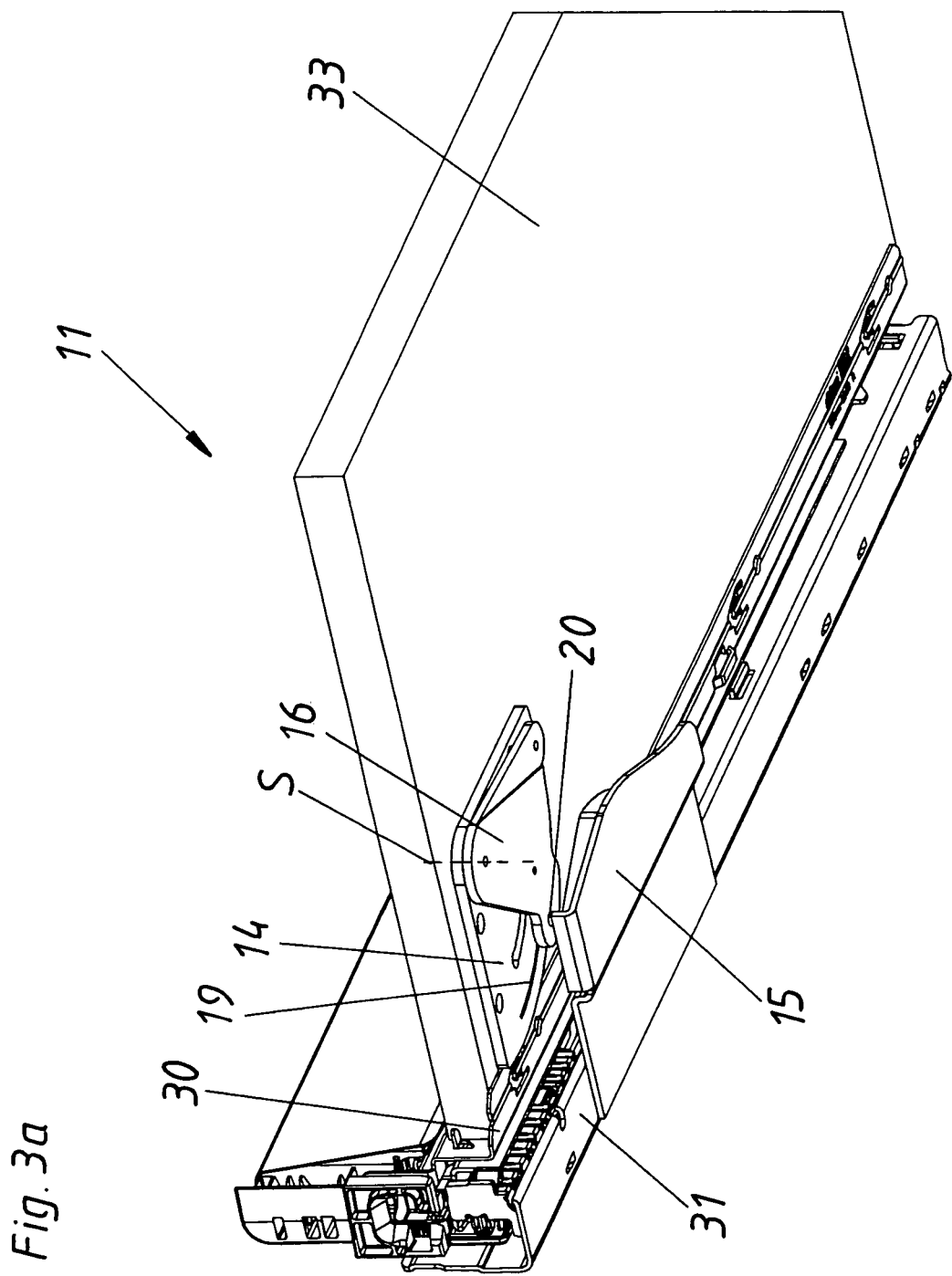

FIG. 3*a* shows a part of a movable furniture part 11, wherein the drawer bottom 33 is mounted to the drawer rail 30. In addition the base elements 14 and 15 which are fixed to the carcass rail 31 and the drawer bottom 33 respectively are shown in the mounted position, the control element 16 being mounted along the pivot axis S on the first base element 14. The drive element 20 bears against the ejection abutment 38 (ejection portion A).

FIG. 4*a* shows a drawer bottom 33 from below, wherein the drawer front SF is diagrammatically shown in the form of a broken line in the upper region. In this view in FIG. 4*a* the locking element 17 is locked in the closed position SS in the cardioid-shaped portion 18 of the locking and unlocking path 19. The spring 12 is in the condition of first medium spring stress 1. The drive element 20 is between the retraction guide element 39 and the ejection abutment 38.

Figure 5A:
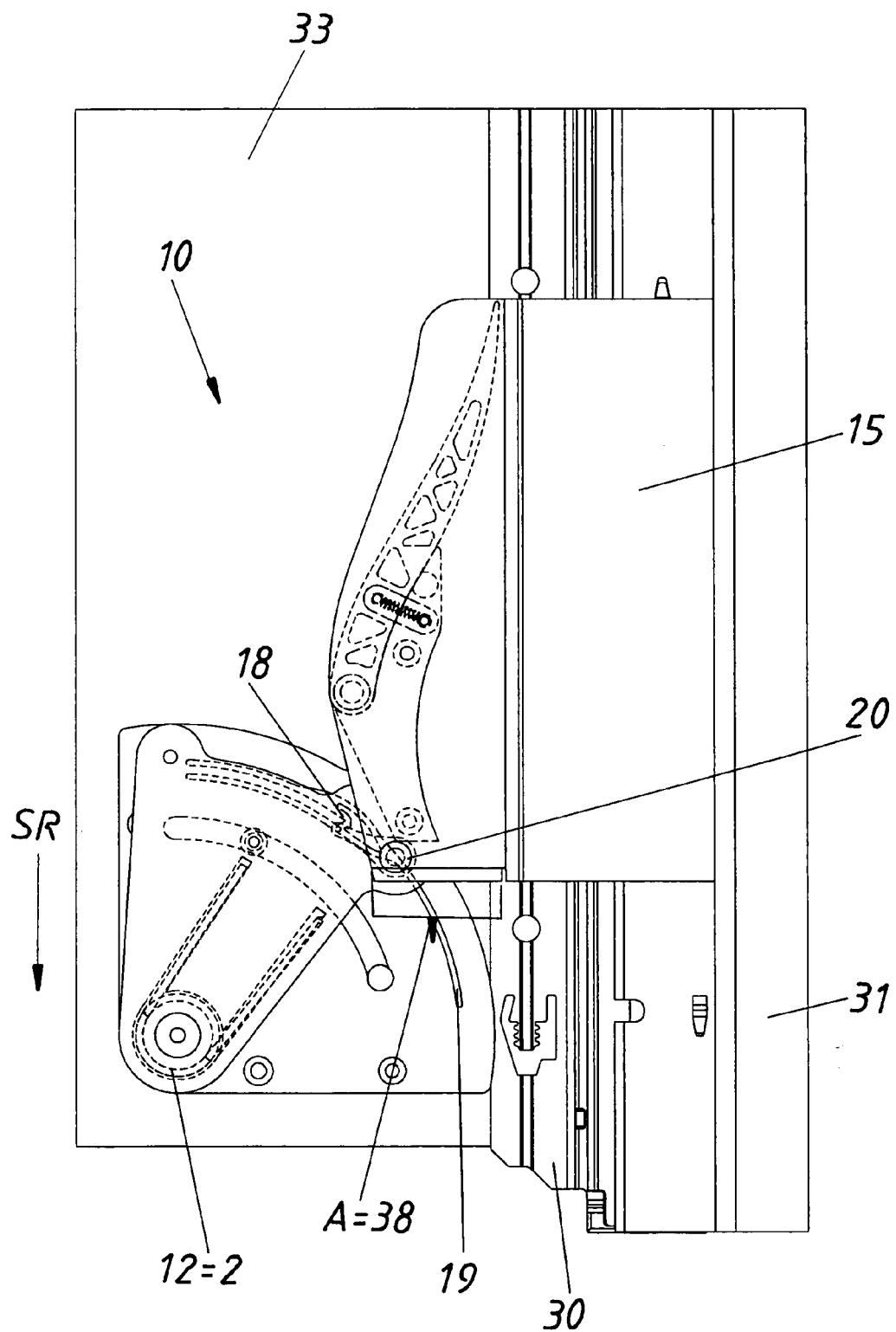

In FIG. 5*a*, by applying pressure to the drawer front SF in the closing direction SR, the drawer bottom 33 with the drawer rail 30 is also moved rearwardly in the closing direction SR relative to the carcass rail 31 whereby the locking projection 17 moves out of the cardioid-shaped portion 18 of the locking and unlocking path 19. That provides for unlocking of the drive device 10. The spring 12 is moved into the condition of slightly increased spring stress 2 by the application of additional pressure in the closing direction SR.

Figure 6A:
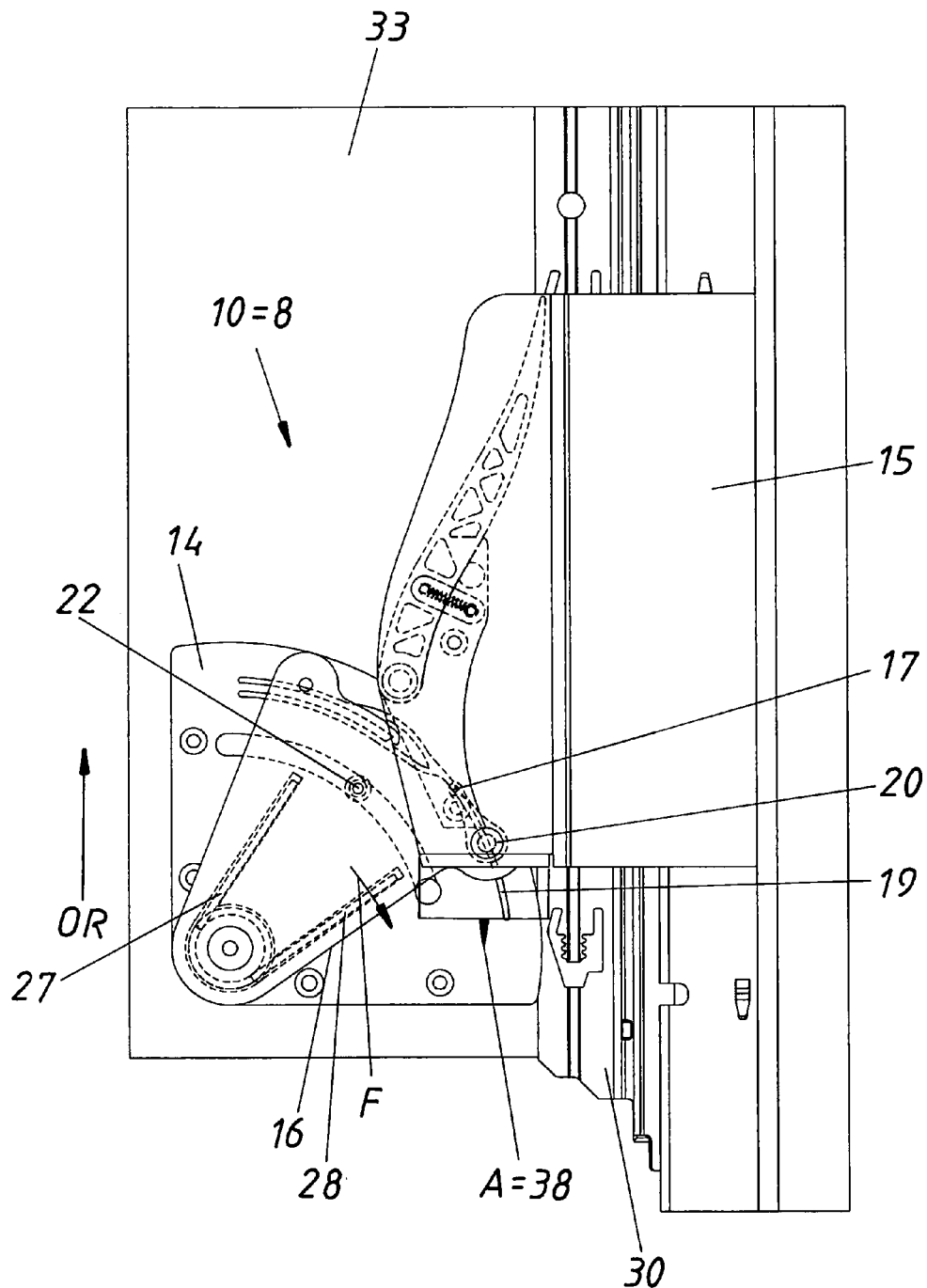

FIG. 6*a* shows what happens after unlocking of the locking element 17: because the locking element 17 is no longer locked in the cardioid-shaped portion 18 of the locking and unlocking path 19 the spring 12 can deliver its spring force F to the control element 16 by way of the leg 28 whereby the control element 16 is pivoted relative to the first base element 14. In that case the drive element 20 arranged on the control element 16 presses against the ejection portion A of the guide path 21, formed by the ejection abutment 38 of the second base element 15. As a result the first base element 14 and therewith the entire drawer 11 moves in the opening direction OR relative to the second base element 15 and thus also relative to the carcass rail 31 and the furniture carcass 26. Thus the drive device 10 forms the ejection device 8, the spring 12 applying the ejection spring force F.

Figure 7A:
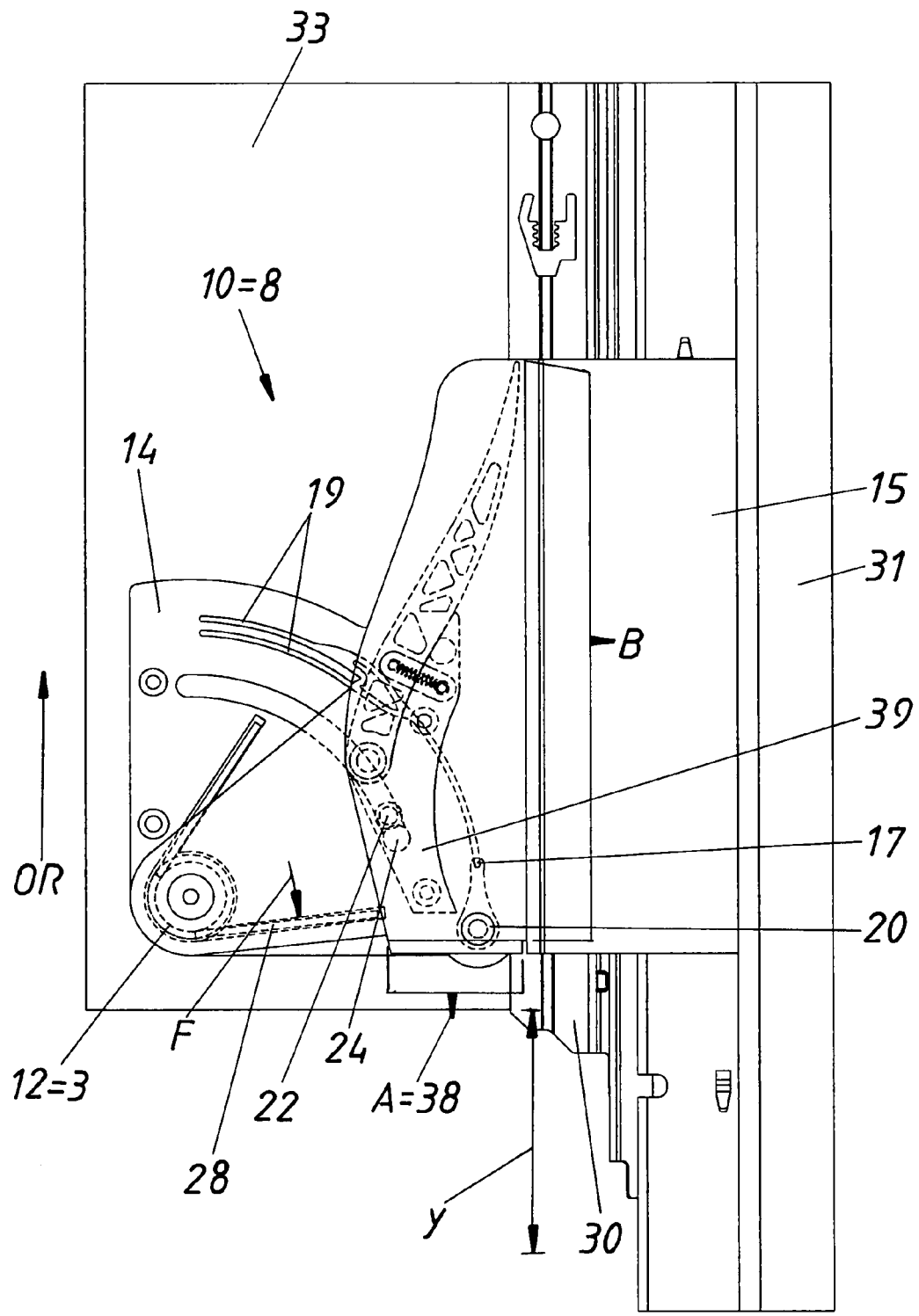

In FIG. 7*a* the ejection process is terminated and the spring 12 has been relieved of stress to the second, relieved spring stress 3, wherein the relative movement of the control element 16 with respect to the first base element 14 is ended by the limiting projection 22 butting against the abutment 24. It is also clear from FIG. 7*a* that the drive element 20 has thus reached the end of the ejection portion A and is no longer limited in the opening direction OR by the retraction guide element 39. The ejection spacing y was covered by the drawer 11 from unlocking until the end of the ejection portion A was reached.

In FIG. 8*a* the drive element 20 is in the free-running portion B, the movable furniture part 11 being pulled out in the opening direction OR. In that case the spring 12 is in the condition of relieved spring stress 4.

If as shown in FIG. 9*a* the movable furniture part 11 is moved further in the opening direction OR then the drive element 20 presses the movement switch 25 against the force of the switch spring 40 and pivots or turns the movement switch 25 on the pivot axis member 41 in relation to the retraction guide element 39 and thus the second base element 15.

If as shown in FIG. 10*a* the drawer 11 is moved further in the opening direction OR and passes outside the free-running portion B then the switch spring 40 pulls the movement switch 25 back into the starting position again. The movable furniture part 11 is now in the complete free-running portion E in which the movable furniture part 11 can be moved as desired in the opening direction OR and the closing direction SR. The spring 12 is still in a condition of relieved spring stress 5. It will be seen in the region of the second base element 15 that the movement switch 25 and its stressing portion C involve an average angle α relative to the closing direction SR and the retraction guide element 39 and its retraction portion D involve an angle β relative to the closing direction SR. Those angles α and β can be such that it is possible to implement an optimum gentle drawer movement complying with the user's wishes. The shallower the angle α is, the correspondingly longer is the stressing portion C whereby the stressing process can take place more gently and with an easier movement. When transposed to the force-travel diagram in FIG. 14 that is also given by the long and relatively shallow stressing travel SW.

In FIG. 11*a* the movable furniture part 11 is again moved in the closing direction SR, wherein the drive element 20 moves along the stressing portion C on the left-hand side of the movement switch 25 by virtue of the movement switch 25 being moved back again. Due to the movement of the drive element 20 along the stressing portion C which is inclined with respect to the closing direction SR the control element 16 is pressed with respect to the base element 14 against the leg 28 of the spring 12 whereby the spring 12 is stressed against the spring force F and the increasing spring stress 6 is attained. In that movement of the control element 16 the locking element 17 also moves along the locking and unlocking path 19 in the direction of the cardioid-shaped portion 18. The limiting projection 22 is also moved from the abutment 24 in the direction of the abutment 23 again. The high point in the stressing process is reached at the point of the stressing portion C, at which the spacing z relative to the free-running portion B is at the greatest.

Figure 12A:
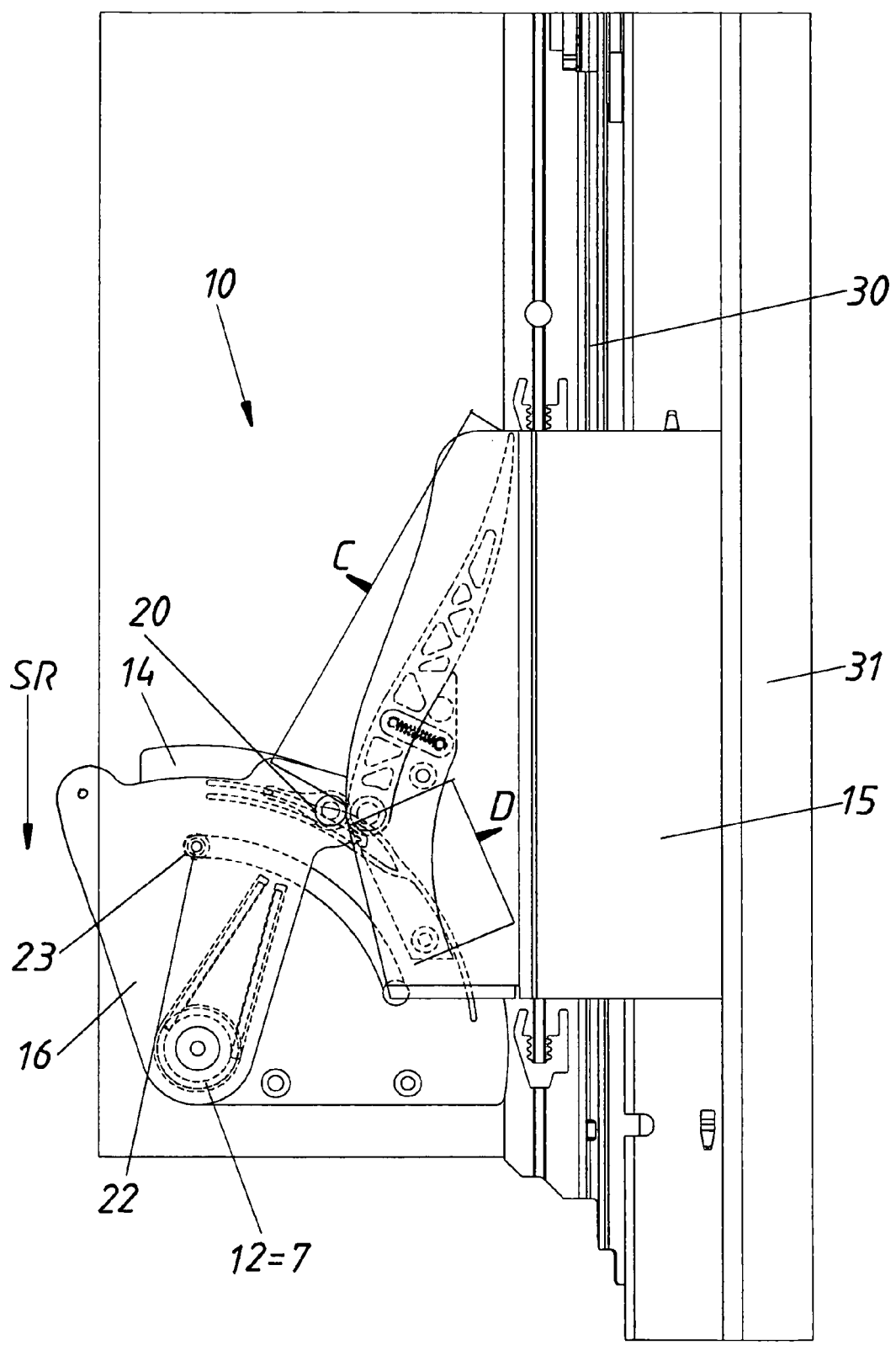

That point is reached in FIG. 12*a*, in which case the spring 12 is stressed by the complete pivotal movement of the control element 16 as far as the abutment 23 in the first base element 14, to reach the third condition of increased spring stress 7. That point of the drive element 20 involves the transition from the stressing portion C into the retraction portion D.

Accordingly FIG. 13*a* shows how the spring 12 is relieved of stress again by the sliding movement of the drive element 20 along the retraction portion D and thereby pulls the movable furniture part into the furniture in the closing direction SR. Accordingly the drive device 10 also operates as a retraction device 9 insofar as the same spring 12 acts in a retracting mode on the movable furniture part 11 by way of the control element 16, the drive element 20 and the retraction portion D, and the movable furniture part 11 reaches the closed position SS after covering the retraction spacing x.

FIG. 14 shows a force-travel diagram, wherein the spring force F of the spring 12 is plotted on the Y-axis and the travel s of the movable furniture part in the opening direction OR or the closing direction SR is plotted on the X-axis. The broken line shows an idealized configuration and can naturally involve fluctuations and curves, in an actual embodiment. From the first medium spring stress 1 in the closed position SS of the movable furniture part the movable furniture part 11 is further moved in the closing direction SR by the application of an increased pressure thereto, in which case the spring force is additionally stressed to the slightly increased spring stress 2. After that unlocking action which is effected by the application of the increased pressure the spring 12 is relieved from the slightly increased spring stress 2, with ejection of the furniture part 11 in the opening direction OR along the second relief travel EW2 as far as the second relieved spring stress 3, the ejection spacing y having been covered in that case. During the further opening movement of the drawer 11 the spring force F of the spring 12 remains at the spring stress 4 and 5. When the movable furniture part 11 is closed a part of the drive device 10 passes into the stressing portion C (stressing travel SW of the spring 12), thereby reaching the increasing spring stress 6 which reaches its high point at point 7 of the spring stress. From that spring stress 7 retraction of the movable furniture part 11 by the retraction spacing x is implemented by way of the retraction portion C and by relief of the stress of the spring force F along the relief travel EW1 from the highest spring stress 7 to the medium spring stress 1. It will also be seen from FIG. 14 that the ejection spacing y is greater than the retraction spacing x. The lower region of FIG. 14 shows the positions of the drive element 20 along the guide path 21, which substantially coincide with the spring stress points 1 through 7.

That overall force-travel diagram in FIG. 14 forms a hysteresis system. In other words after the cause of stressing ceases to apply (cause: closing movement of the movable furniture part) the energy stored in the stressing operation is delivered in two steps (retraction movement and ejection movement), thereby giving continuity of the action of the stressing process after cessation of the stress-inducing closing movement. Thus the stressing travel SW between the spring stresses 5 and 7 is longer than the ejection travel EW2 between the spring stresses 2 and 3.

FIG. 1*b* shows a view of an article of furniture 32 from below, wherein arranged at the underside U of the drawer bottom 33 in the front region is a second embodiment of a drive device 10 according to the invention, the drive device 10 forming both the retraction device 9 and also the ejection device 8. In this respect identical references denote the same elements as in the first embodiment shown in FIGS. 1*a* through 13*a*. Accordingly in FIG. 1*b* the first base element 14 (with the pivotable control element 16) is mounted to the carcass 26 or the carcass rail 31 while the second base element 15 is mounted to the drawer rail 30.

FIG. 2*b* shows an exploded view of a drawer extension guide 29, with a damping device 13 being operative between the carcass rail 31 and the drawer rail 30. It will be appreciated that in the first embodiment also such a damping device 13 can be used in a similar or the same fashion. Unlike the first embodiment the second base element 15 is fixed to the drawer rail 30 and has a vertically spring-loaded movement switch 25 in the form of a tongue spring. The first base element 14 is mounted to the carcass rail 31 and at its underside has a control element 16 which is mounted pivotably at the pivot axis S and which is limitedly pivotably mounted between the abutments 23 and 24 by way of the limiting projection 22. The limiting projection 22 at the same time forms the drive element 20 for the second base element 15, while provided at the underside thereof (see FIG. 3*c*) is the guide path 21 (not yet shown) into which the limiting projection 22/drive element 20 engages. The control element 16 is acted upon by the coil spring 12 and in the front region has a pivotably mounted locking element 17 which engages into a locking and unlocking path 19 at the underside of the first base element 14 (see FIG. 3*c*).

Figure 3B:
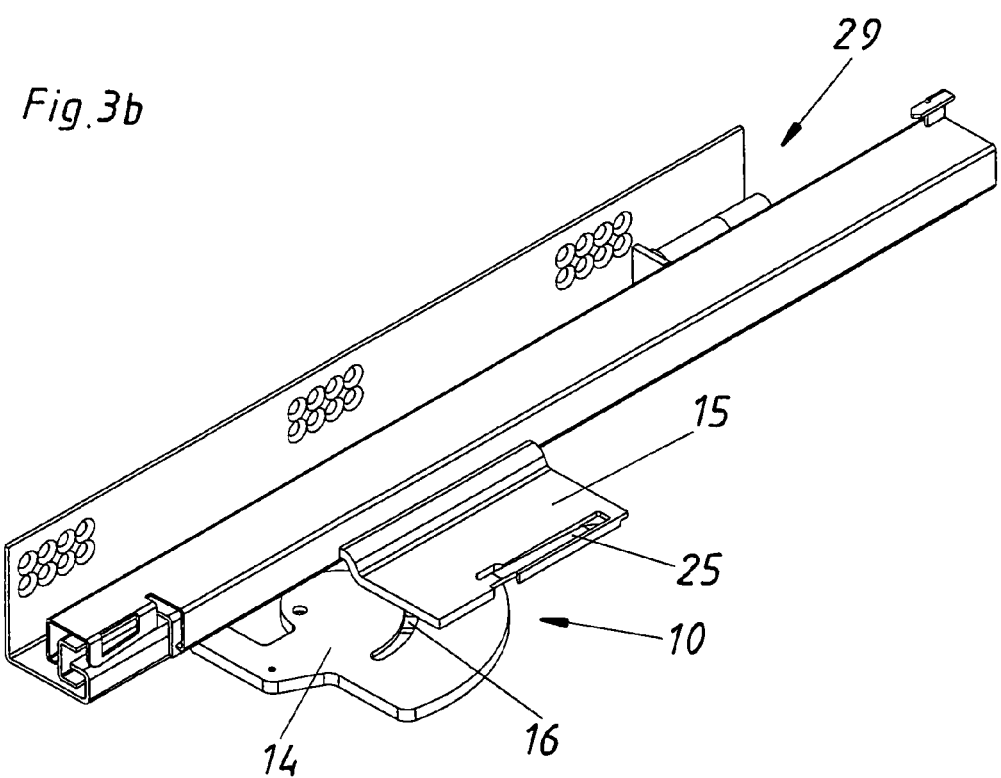

FIG. 3*b* shows the drawer extension guide 29 with the drive device 10 mounted thereto in the assembled condition.

Figure 3C:
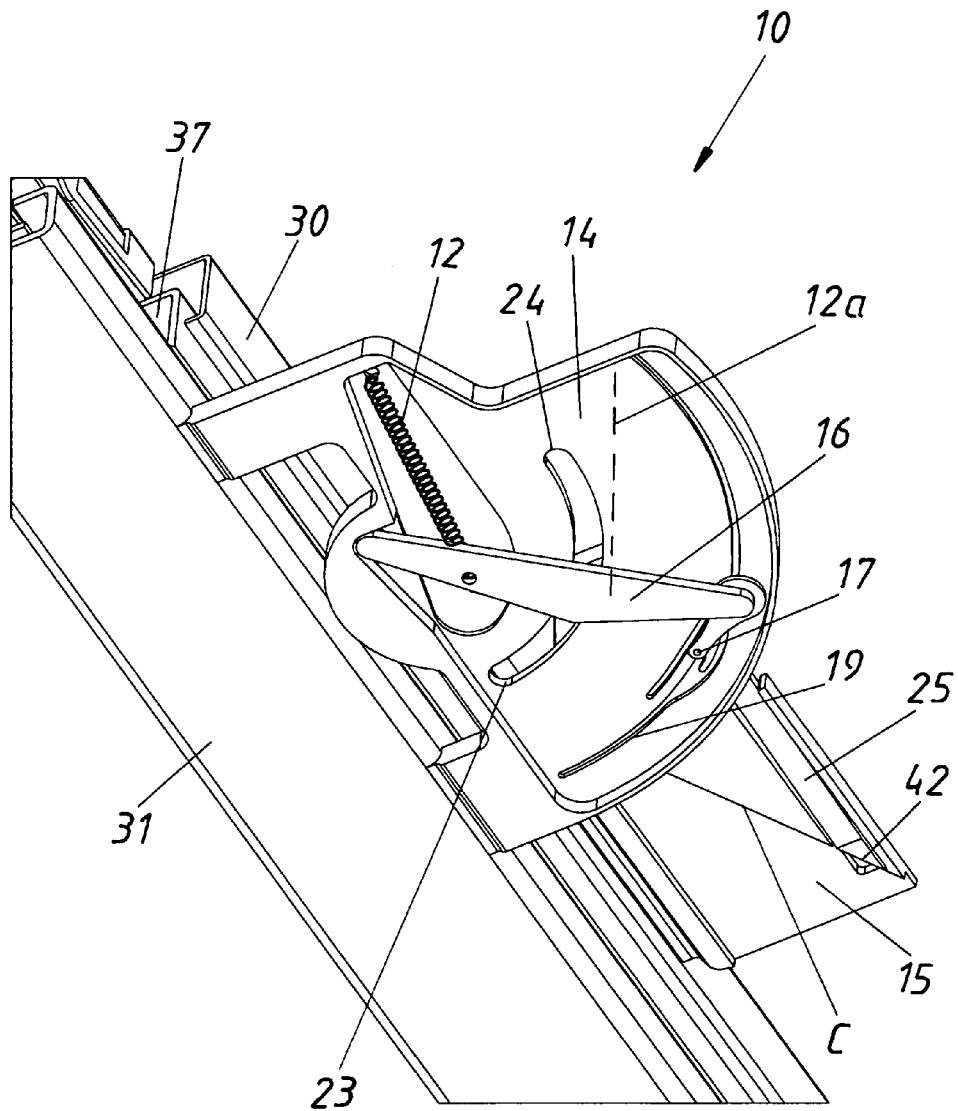
FIG. 3c shows the second embodiment of the drive device from below, FIGS. 4a+4b show the drive device in the locked position, FIGS. 5a+5b show the drive device in the unlocked position, FIG. 6a+6b show the drive device upon ejection, FIGS. 7a+7b show the drive device after termination of the ejection process, FIGS. 8a+8b show the continuing opening movement after ejection, FIGS. 9a+9b show the drive element when leaving the free-running portion, FIGS. 10a+10b show the position of the base elements in completely free-running relationship with each other, FIGS. 11a+11b show the position of the drive device upon stressing of the spring, FIGS. 12+12b show the position of the drive device with the completely stressed spring, FIGS. 13a+13b show the position of the drive device upon retraction of the movable furniture part.

Corresponding thereto FIG. 3*c* shows a view from below of the drive device 10, showing the inclined deflection portion 42 of the movement switch 25 which deflects the drive element 20 in the direction of the stressing portion C. As an alternative configuration of the present invention, FIG. 3*c*, in broken line, shows a second spring 12*a* for forming a spring pack which could additionally act on the control element 16. Depending on its respective configuration and arrangement, the spring pack could deploy its effect for example primarily upon retraction or ejection and could thus improve the process which is being respectively assisted and could thus make it easier in terms of motion.

In comparison with the first embodiment of the present drive device 10 FIGS. 4*b* through 13*b* show the drawer front, illustrated in broken line, in the lower region of the respective Figure. In addition FIGS. 4*b* through 13*b*—in contrast to FIGS. 4*a* through 13*a*—show a view from above onto the drive device 10.

Figure 4B:
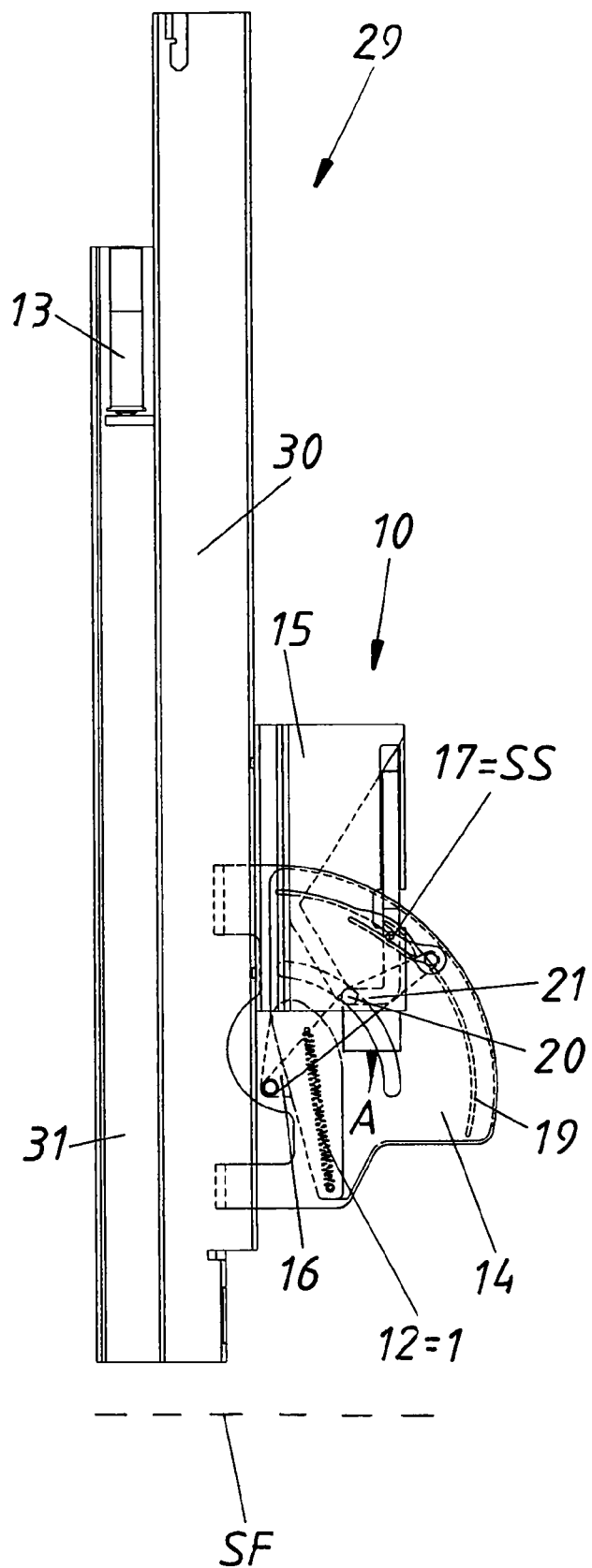

In FIG. 4*b* the locking element 17 is in the closed position SS in the cardioid-shaped portion 18 of the locking and unlocking path 19. The spring 12 is in the first condition of medium spring stress 1.

Figure 5B:
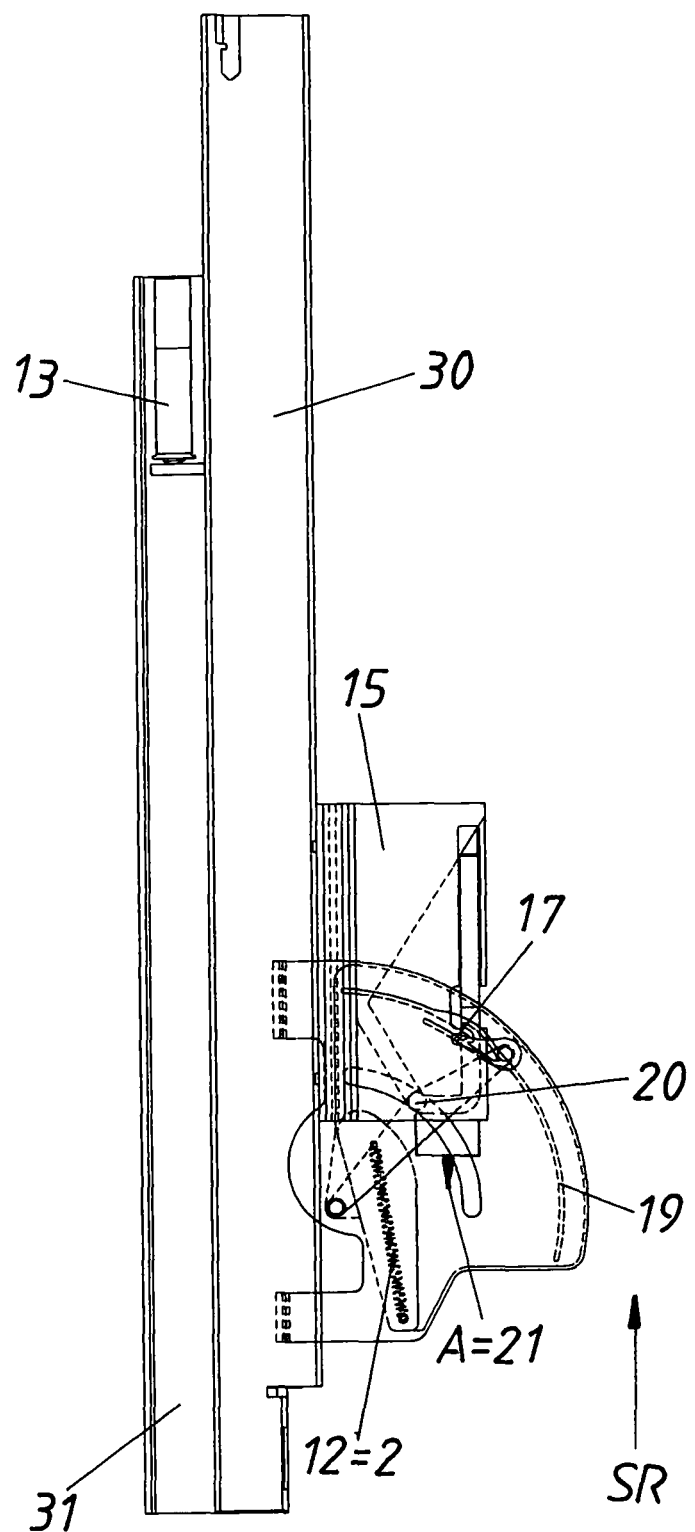

The locking element 17 is unlocked by applying an increased pressure to the drawer 11 in the closing direction SR and the spring 12 is in the condition of slightly increased spring stress 2 (see FIG. 5*b*).

Figure 6B:
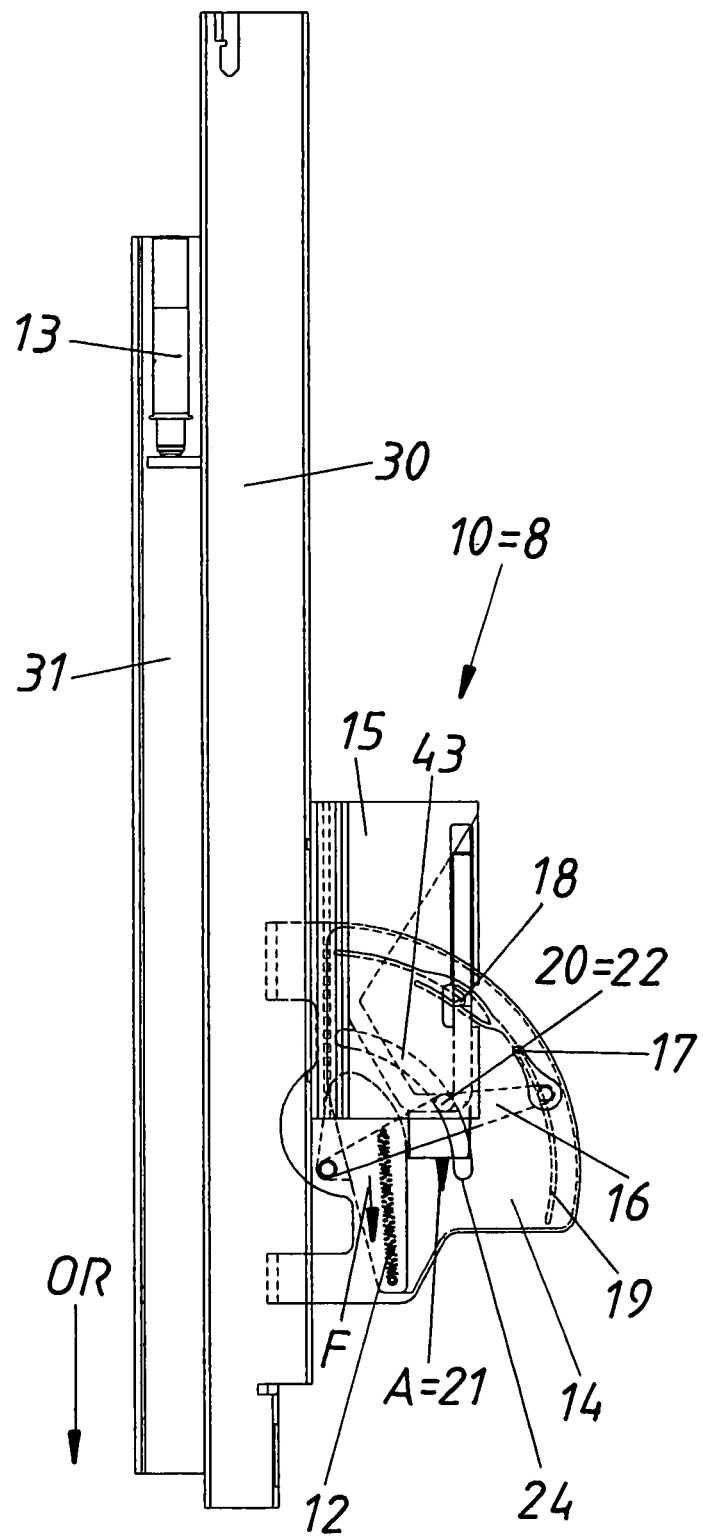

In FIG. 6*b* the drawer rail 30 is ejected by the guide path 21 in the second base element 15 and its ejection portion A by way of the drive element 20, wherein the drive element 20 is moved in the pivotal path 43 of the limiting projection 22 in the direction of the abutment 24 by relief of the spring 12 in the direction of the spring force F. Thus the spring 12 serves as a force-generating device for the drive device 10 which functions as the ejection device 8.

Figure 7B:
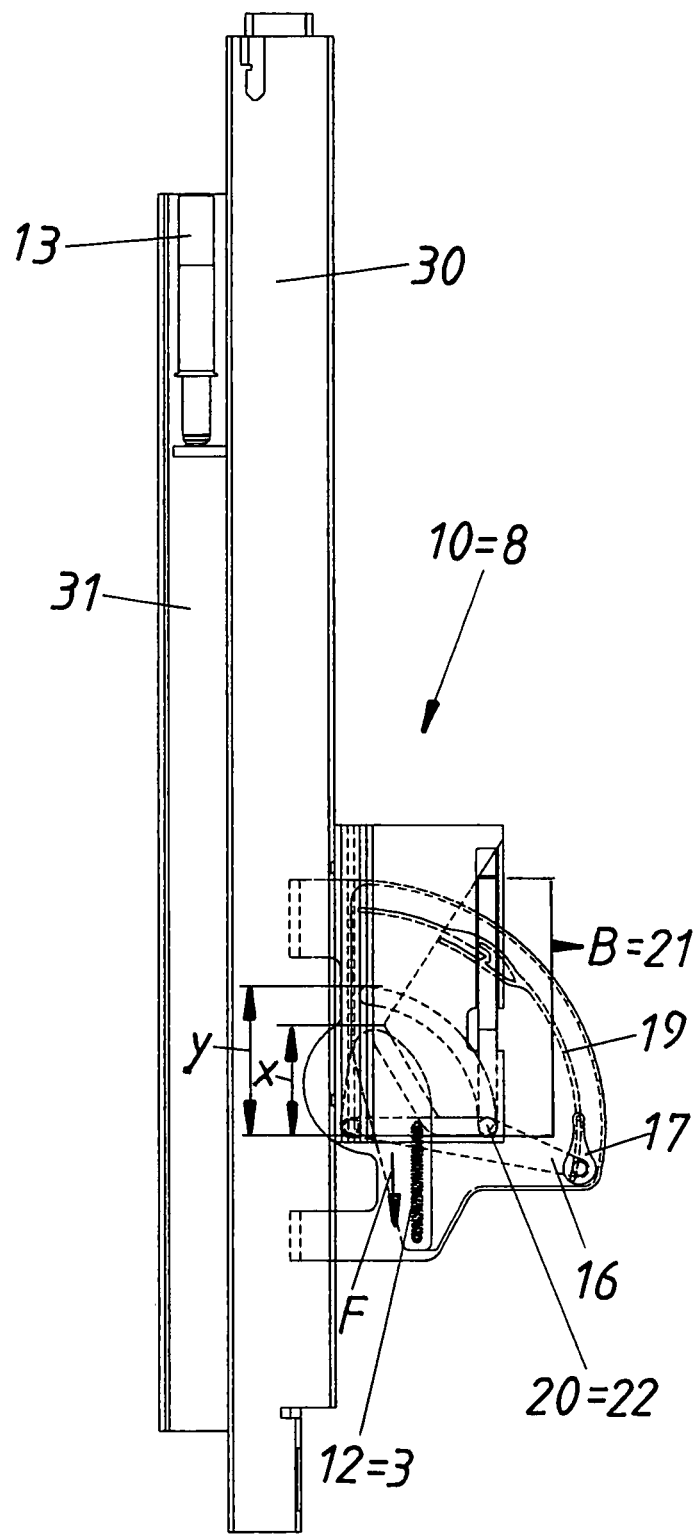

In FIG. 7b the spring 12 reaches the condition of relieved spring stress 3 and the drive element 20 reaches the free-running portion B of the guide path 21.

Figure 10B:
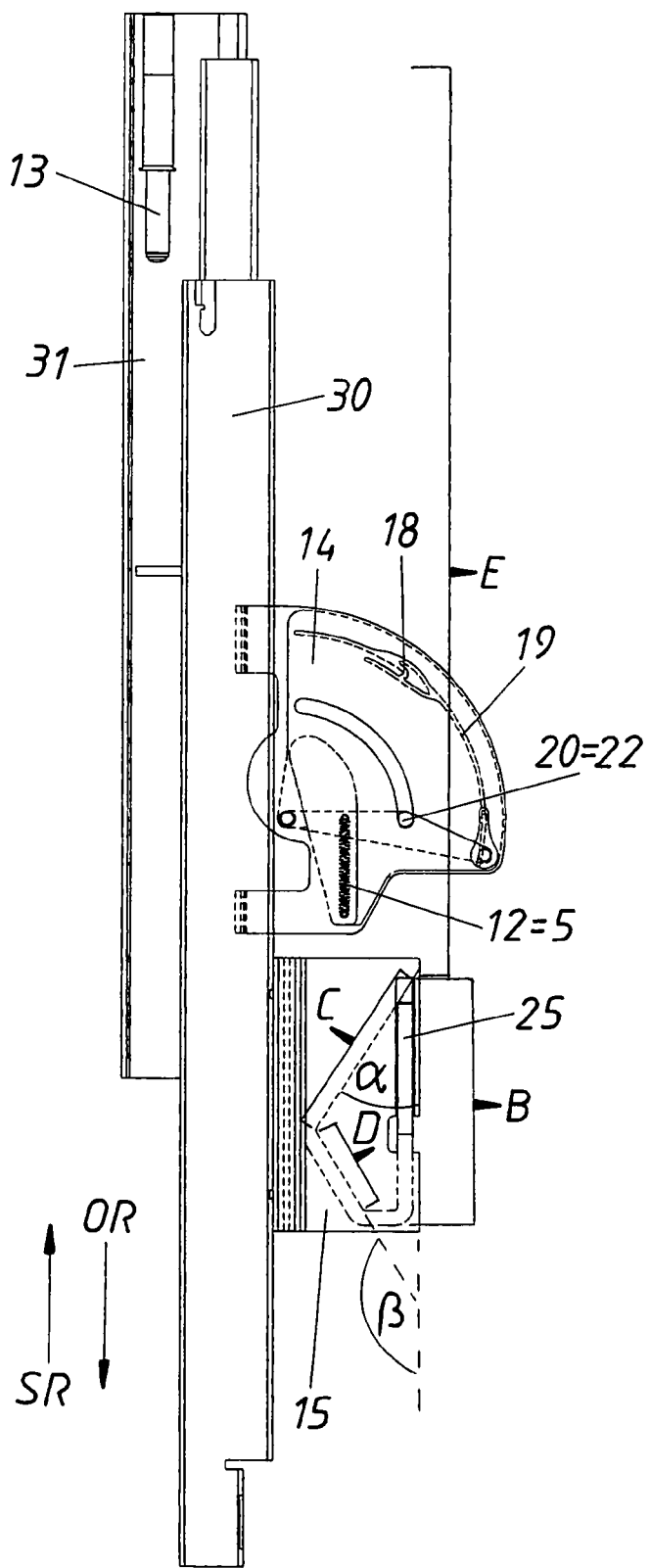

In that region the movable furniture part 11 or the second base element 15 can be freely moved in the opening direction OR while the spring 12 is further disposed in the relieved spring stress 4 (FIG. 8). If in that case the drive element 20 slides along the movement switch 25 then the movement switch 25 is urged vertically upwardly against the spring force F so that the drive element passes from the position in FIG. 9b into the further free-running portion E in FIG. 10b. The preferred angles α and β for the stressing portion C and the retraction portion D are shown in FIG. 10b.

Upon the movement of the furniture part 11 in the closing direction (see FIG. 11b) the drive element 20 is deflected by the inclined deflection portion 42 into the stressing portion C whereby the control element 16 pivots against the action of the spring force F of the spring 12 (increasing spring stress 6).

Figure 12B:
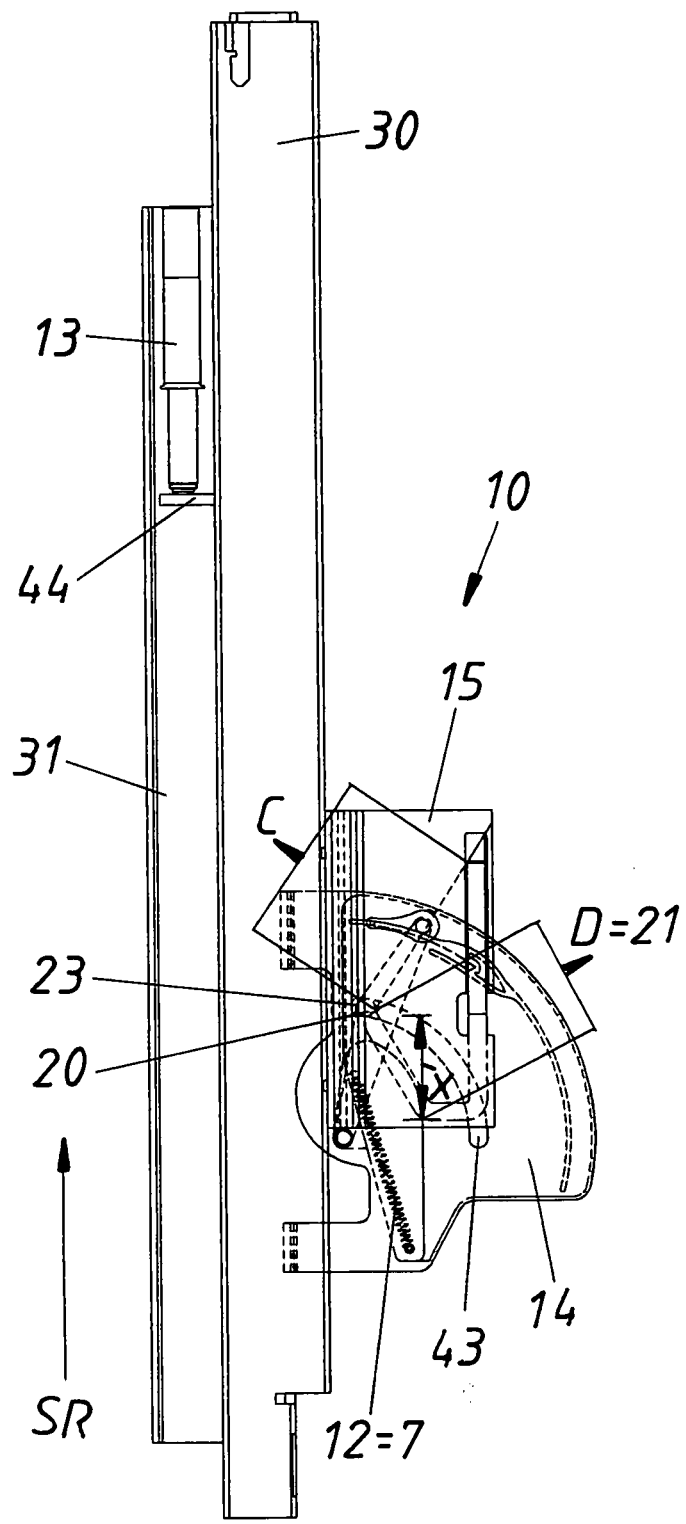

In FIG. 12b the drive element 20 reaches the high point or the transition between the stressing portion C and the retraction portion D, in which case the drive element 20/limiting projection 22 at the same time reaches the abutment 23 of the pivotal path 43 and the spring 12 reaches the third, highest spring stress 7. At that time the projection 44 on the drawer rail 30 also butts against the damping device 13. The guide path 21 "kinks" at the transition between the portion C through between about 40° and 80°, preferably between 50° and 70°.

Figure 13B:
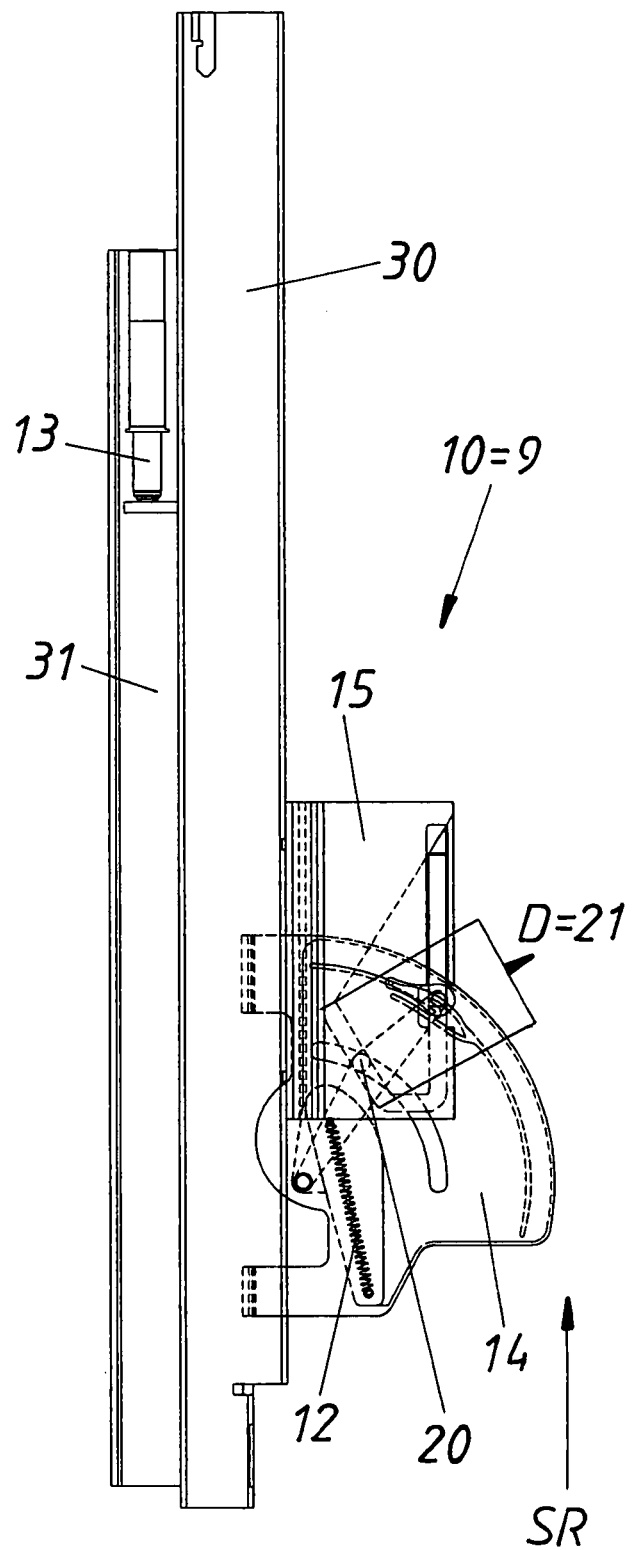

As soon as the highest point of the stressing portion C has been passed the drive element 20 passes into the region of influence of the retraction portion D, in which the spring 12 contracts, with pivotal movement of the control element 16, and in that case moves the second base element 15 in the closing direction SR relative to the first base element 14, in which case that movement can be damped by the damping device 13. Thus in this second embodiment and therein as shown in FIG. 13b the spring 12 also acts as a retraction force for the drive device 10 which takes over the function of a retraction device 9.

Figure 15:
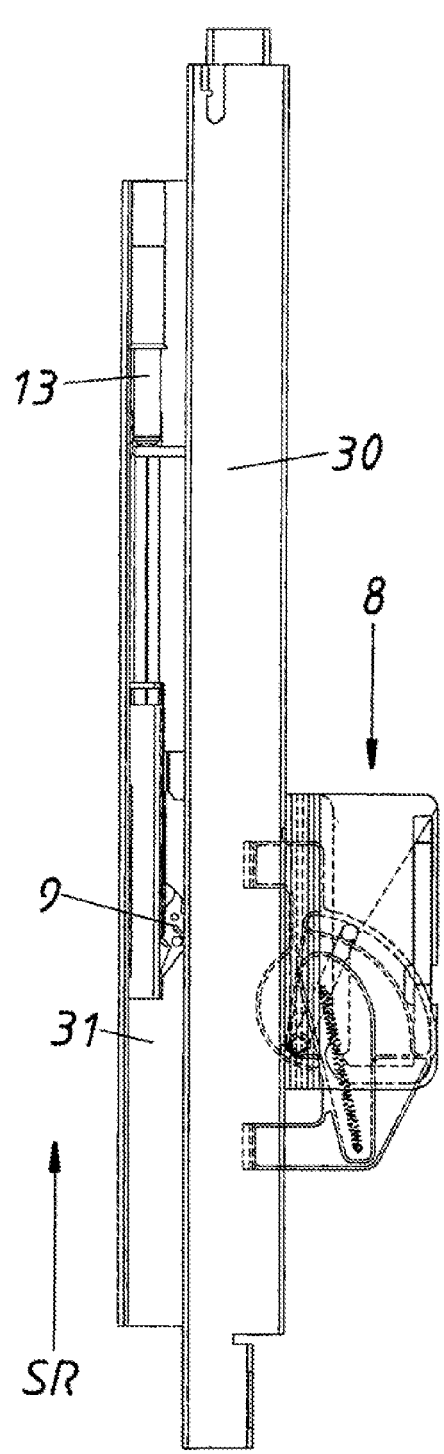
FIG. 15 shows an ejection device according to the state of the art upon termination of stressing of the ejection spring.
Figure 16:
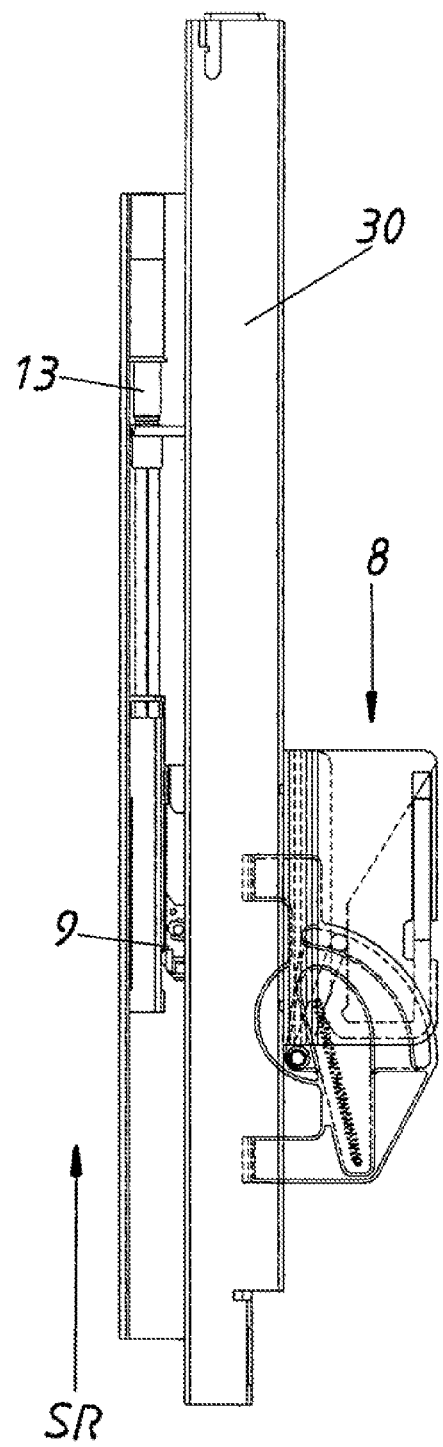
FIG. 16 shows an ejection device according to the state of the art, wherein a separate retraction device retracts the furniture part.

FIGS. 15 and 16 showing the state of the art of separately provided ejection devices 8 and retraction devices 9 as disclosed in WO 2007/028177 A1 have already been appropriately discussed in the introductory part of the present description.

Figure 17:
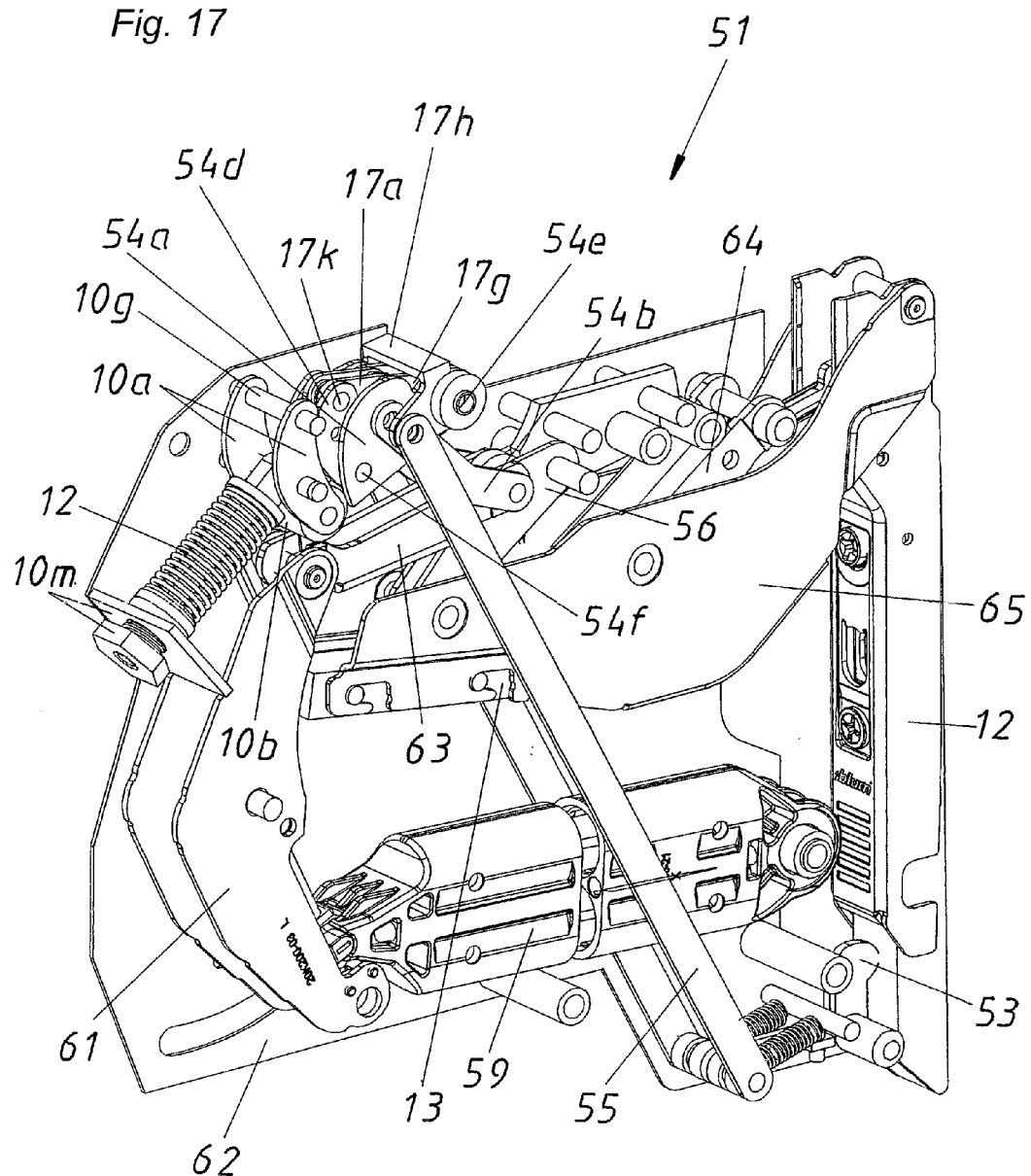
FIG. 17 shows a 3-D image of a third embodiment with a furniture drive for a furniture flap.

FIG. 17 onward shows a third embodiment of a drive device 10 according to the invention, which is part of a furniture drive 51 for a furniture flap (not shown). In this case the drive device 10 and a connecting device 54 are integrated into a per se known control arm arrangement (as can be seen for example from WO 2011/020130 A1 or DE 20 2005 021 541 U1) for the furniture flap and that is in turn fixed to a mounting plate 62.

Figure 18:
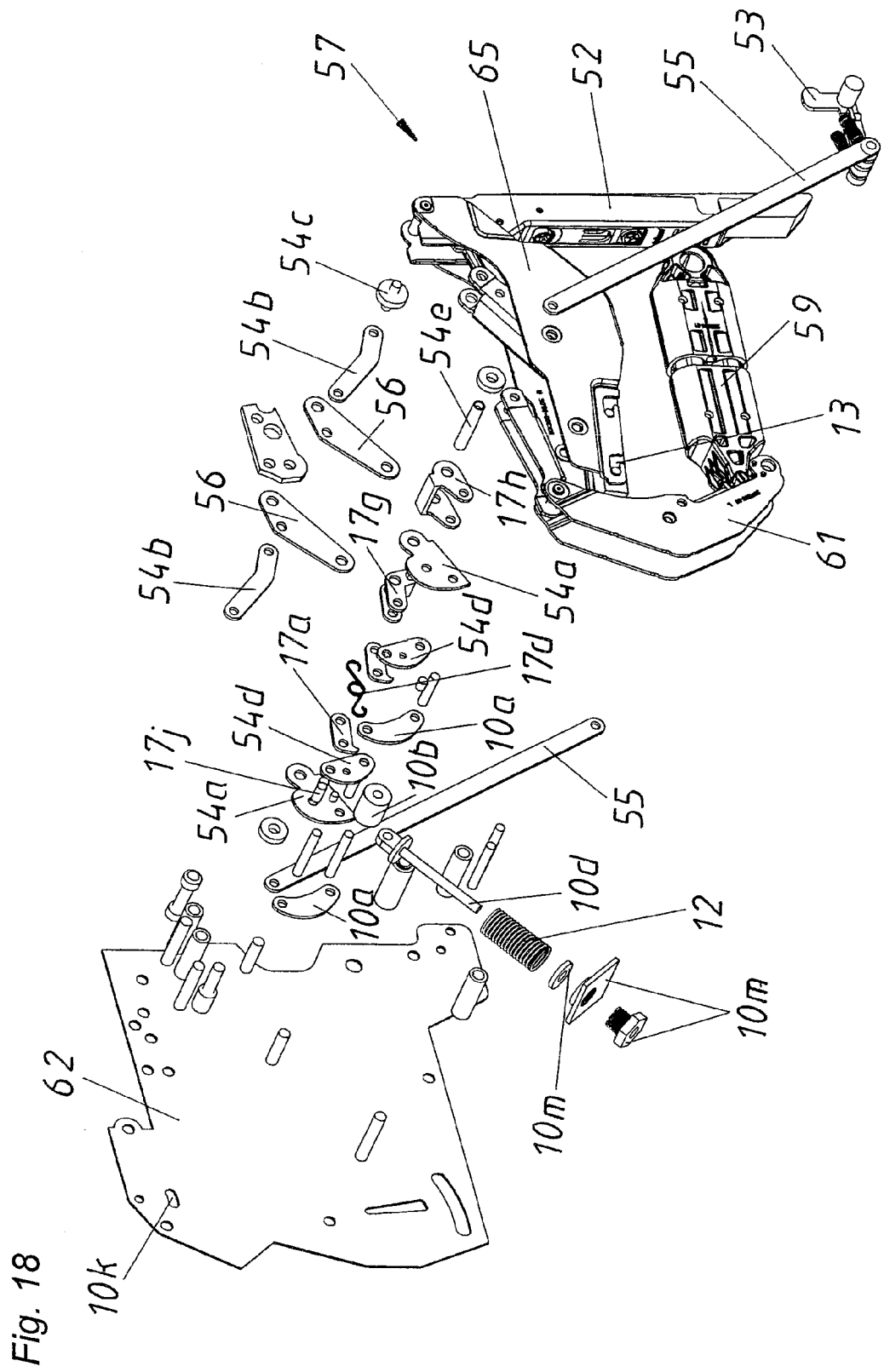
FIG. 18 shows an exploded view of FIG. 17, FIGS. 19 through 26 show the succession of movements of the third embodiment in a side view, and FIGS. 27 through 35 diagrammatically show the succession of movements of a fourth embodiment of a drive device with a spring for ejection and retraction.

FIG. 18 shows an exploded view of FIG. 17, wherein all essential components are denoted by a reference numeral. Some subsidiary components such as for example connecting bolts or the like do not have any reference. Explanation of the operating principle however is possible even without directly specifying those components by means of references. The control arm 52 is shown in the closed position in both of FIGS. 17 and 18.

FIGS. 19 through 26 show the furniture drive 51 without furniture carcass and furniture flap (movable furniture part). This furniture drive 51 is fixed to a side wall of a furniture carcass 26 by way of the mounting plate 62 and moves a furniture flap by way of a control arm arrangement and a control arm 52. Preferably that furniture flap is pivotable about a horizontal pivot axis.

Figure 19:
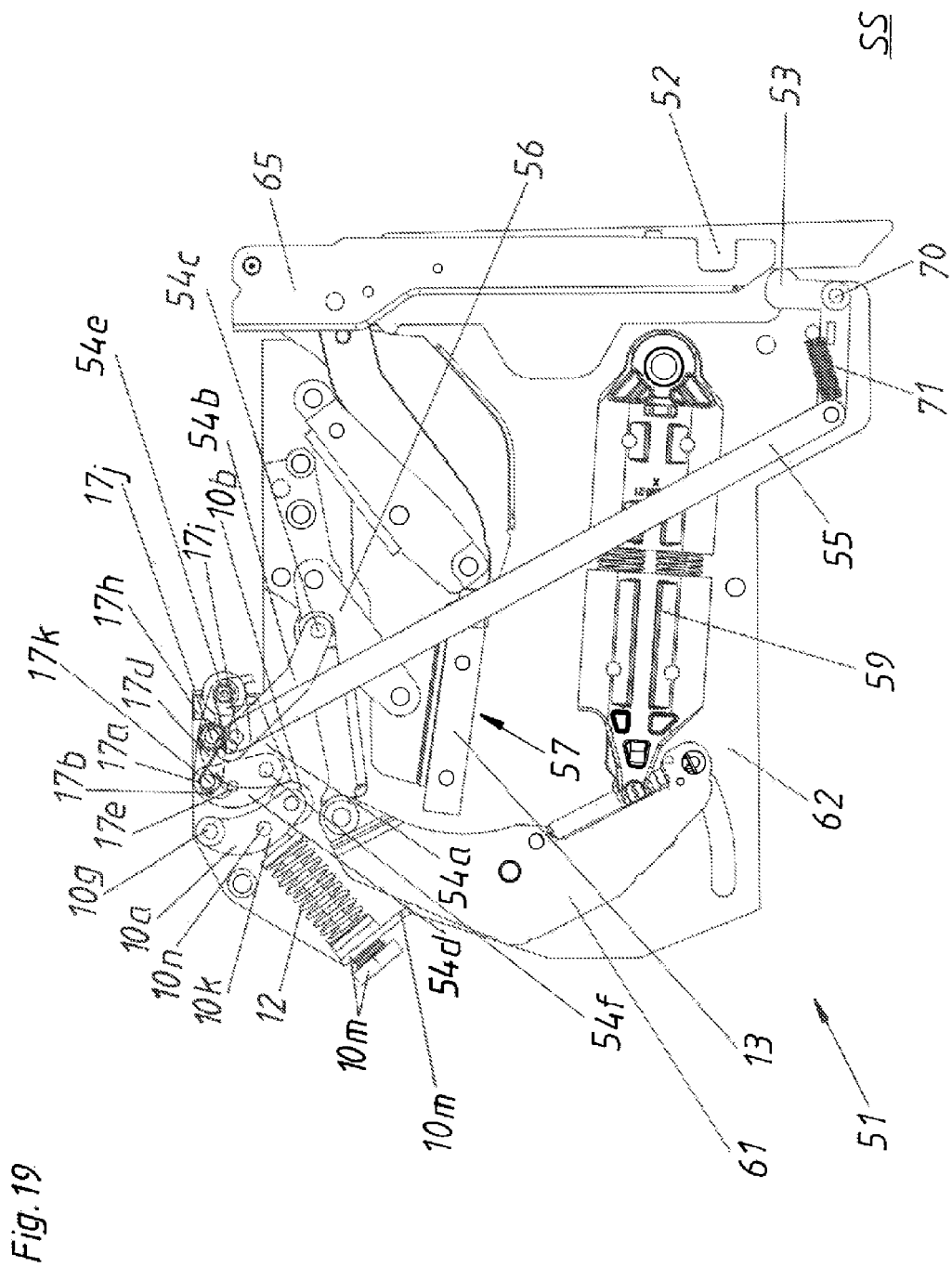

In FIG. 19 the control arm 52 (and thus also the furniture flap which is not shown) are in the closed position SS. In that case the trigger element 53 bears against the control arm 52 or against the furniture flap itself. That trigger element 53 is connected, in this case integrally, to the transmission mechanism 55 by way of the pivot axis 70 which is stationary relative to the mounting plate 62. The spring 71 (tension spring) acts on the transmission mechanism 55 in such a way that the latter always seeks to move about the pivot axis 70 in the clockwise direction. At its end the transmission mechanism 55 is connected to an unlocking element 17h by way of a connecting pin 17i. That unlocking element 17h is pivotable about the ejection pivot axis 54e. The part 17g of an articulated lever is also pivotable about the ejection pivot axis 54e. At the other end that part 17g is connected to the locking lever 17a by way of the articulated lever pin 17j. Together 17j, 17g and 17a form the articulated lever. Coiled around the articulated lever pin 17j is a locking spring 17d which seeks to urge the articulated lever pin 17j upwardly with respect to the ejection pivot axis 54e and the holding nose pin 17k. In the FIG. 19 view the articulated lever pin 17j is slightly above a notional line between the ejection pivot axis 54e and the holding nose pin 17k. Further movement of the articulated lever pin 17j upwardly is prevented by the holding nose 17b of the locking lever 17a bearing against the locking projection 17e. That locking projection 17e is arranged on the stressing cam 54d. The stressing cam 54d is in turn connected on the one hand to the locking lever 17a by way of the holding nose pin 17k and on the other hand to the contact lever 54a by way of the stressing cam pivot axis 54f. That lever 54a in turn is mounted pivotably about the ejection pivot axis 54e. In addition the lever 54a is connected to the connecting lever 54b by way of the ejection pin 54g. The lever 54b in turn is connected to the element 56 of the lever mechanism 57 by way of the connecting pin 54c whereby the movements of the element 56 and the lever 54a constantly correspond.

The spring 12 (compression spring) is fixedly connected at one end to the mounting plate 62 by way of the mounting elements 10m. At the other end the spring 12 is connected to a guide projection 10n which in turn is guided in a guide path 10k in the mounting plate 62. In addition the spring 12 is connected by way of the guide projection 10n to the ejection lever 10a which in turn is pivotable about the fixed pivot axis 10g connected to the mounting plate 62. At the right-hand lower end the ejection lever 10a has a pressure roller 10b which is in contact in the slightly inwardly displaced region between the contact lever 54a and the stressing cam 54d. In that closed position SS the force of the spring 12 presses against the stressing cam 54b by way of the pressure roller 10b. Since as a further consequence force is applied to the locking lever 17a by way of the holding nose pin 17k the articulated lever pin 17j is urged upwardly in the closed position SS to such an extent as is allowed by abutment of the holding nose 17b against the locking projection 17e.

Figure 20:
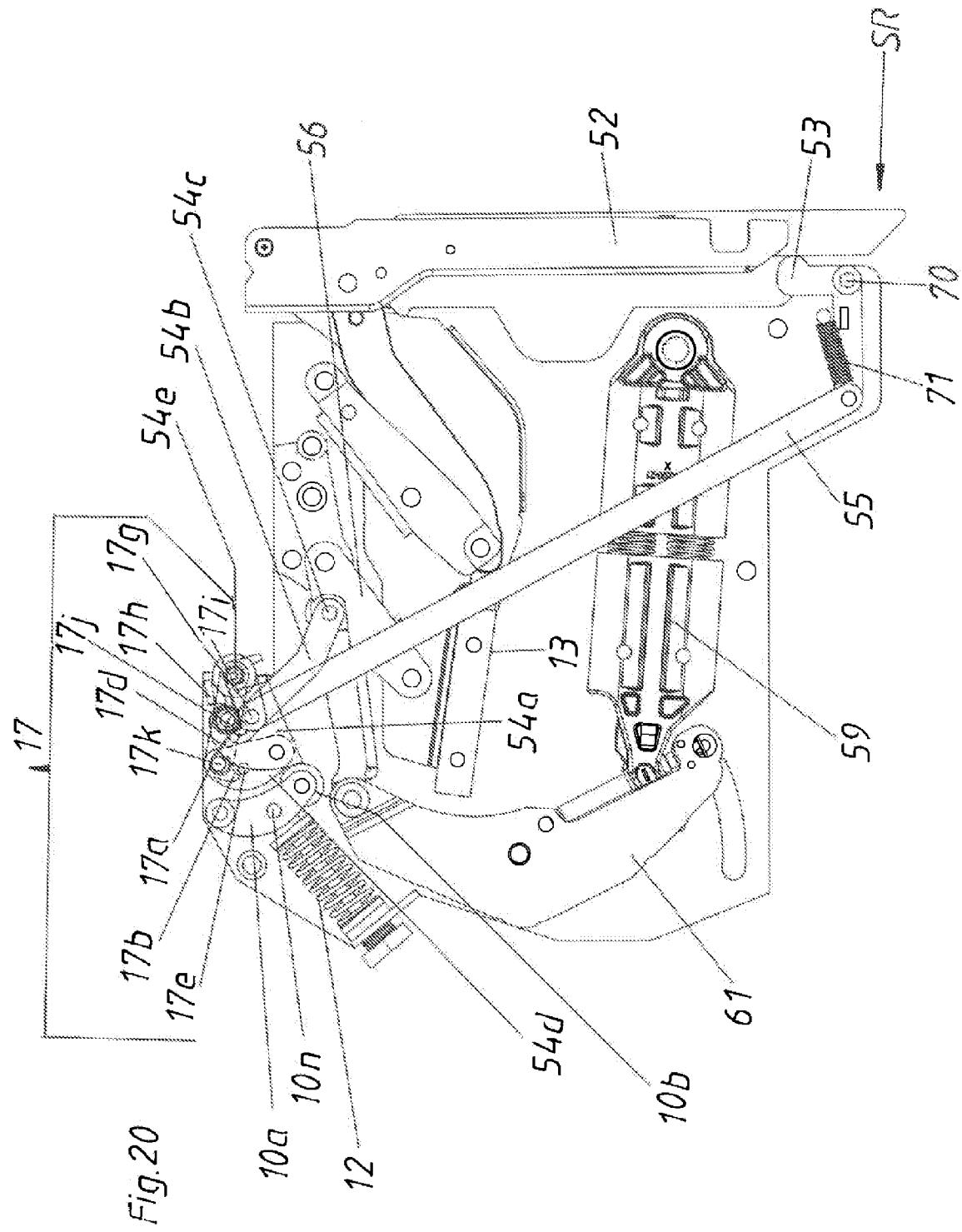

If now—as shown in FIG. 20—pressure is applied in the closing direction SR to the furniture flap or the control arm 52 the trigger element 53 is also urged in the closing direction SR and the transmission mechanism 55 is pivoted about the pivot axis 70 against the force of the spring 71, whereby in turn as a further consequence the unlocking element 17h is moved about the ejection pivot axis 54 in the counter-clockwise direction by way of the connecting pin 17i. As a result the unlocking element 17*h* comes into abutment with the rear part 17*g* of the articulated lever and thereby moves the articulated lever pin 17*j* below the notional line between the ejection pivot axis 54*e* and the holding nose pin 17*k*. That also takes place against the force of the locking spring 17*d*. As soon as the articulated lever pin 17*j* passes below the notional line the spring force of the opening spring 12 no longer acts lockingly on the locking lever 17*a* and the holding nose 17*b* by way of the pressure roller 10*b* and the stressing cam 54*d*, but bends the articulated lever in against the force of the spring 17*d*. The parts identified by references 17*a*, 17*b*, 17*d*, 17*e*, 17*g*, 17*h*, 17*i*, 17*j* and 17*k* jointly form a locking device 17 corresponding to the locking element 17 of the first two embodiments.

Figure 21:
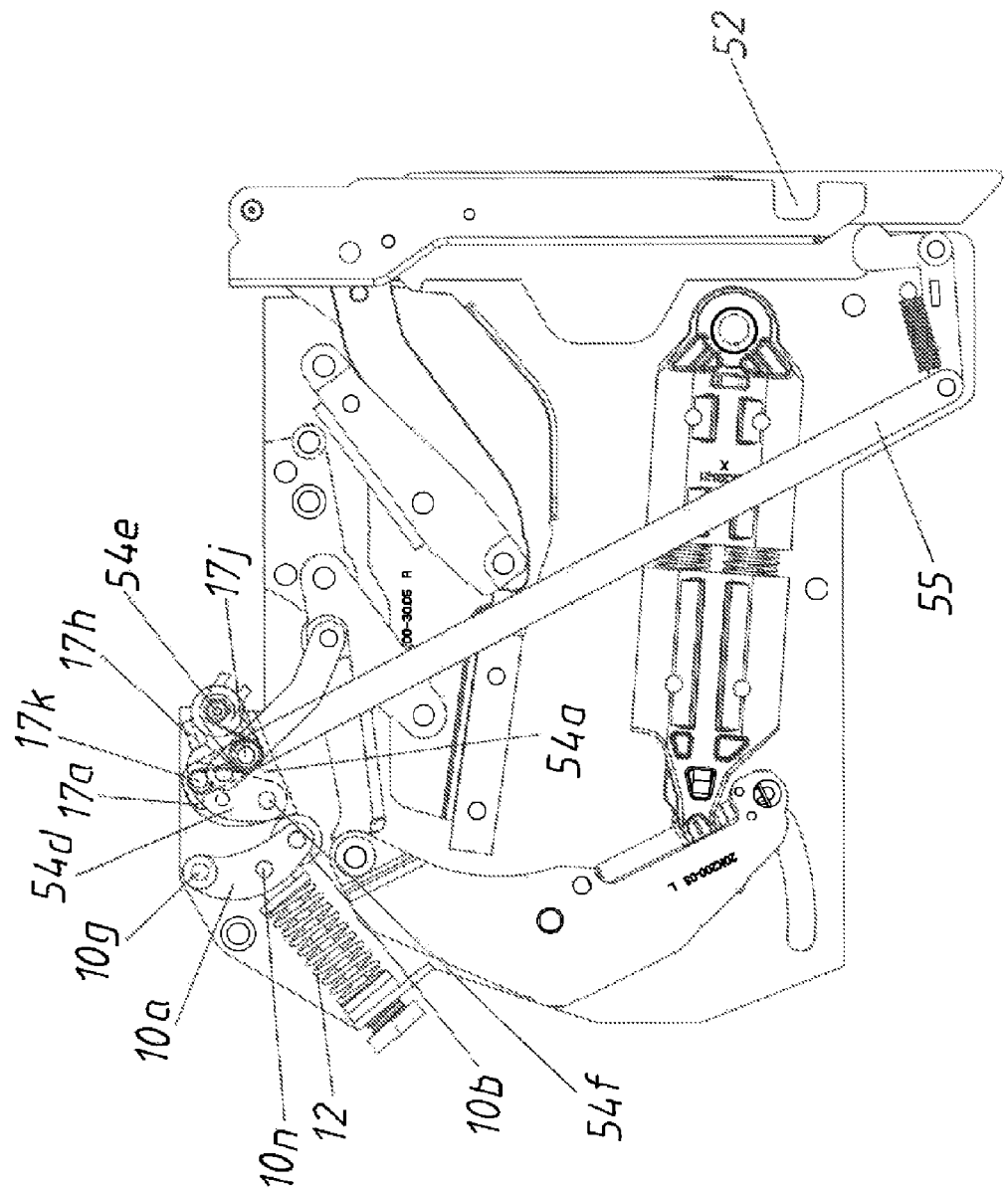

Due to the unlocking action the articulated lever passes into the completely inwardly displaced position shown in FIG. 21 in which the articulated lever pin 17*j* is clearly below the notional line between the ejection pivot axis 54*e* and the holding nose pin 17*k*. Simultaneously with the inward movement of the articulated lever the stressing cam 54*d* is also pivoted in the clockwise direction about the stressing cam pivot axis 54*f* so that the left-hand edges (cam surfaces) of the stressing cam 54*d* and of the ejection lever 54*a* come to bear precisely one above the other and cover each other from the illustration point of view. Simultaneously with the inward pivotal movement of the stressing cam 54*d* the pressure roller 10*b* also begins to roll along with stress relief of the spring 12 whereby the ejection lever 54*a* is rotated in the counter-clockwise direction about the ejection pivot axis 54*e*.

Figure 22:
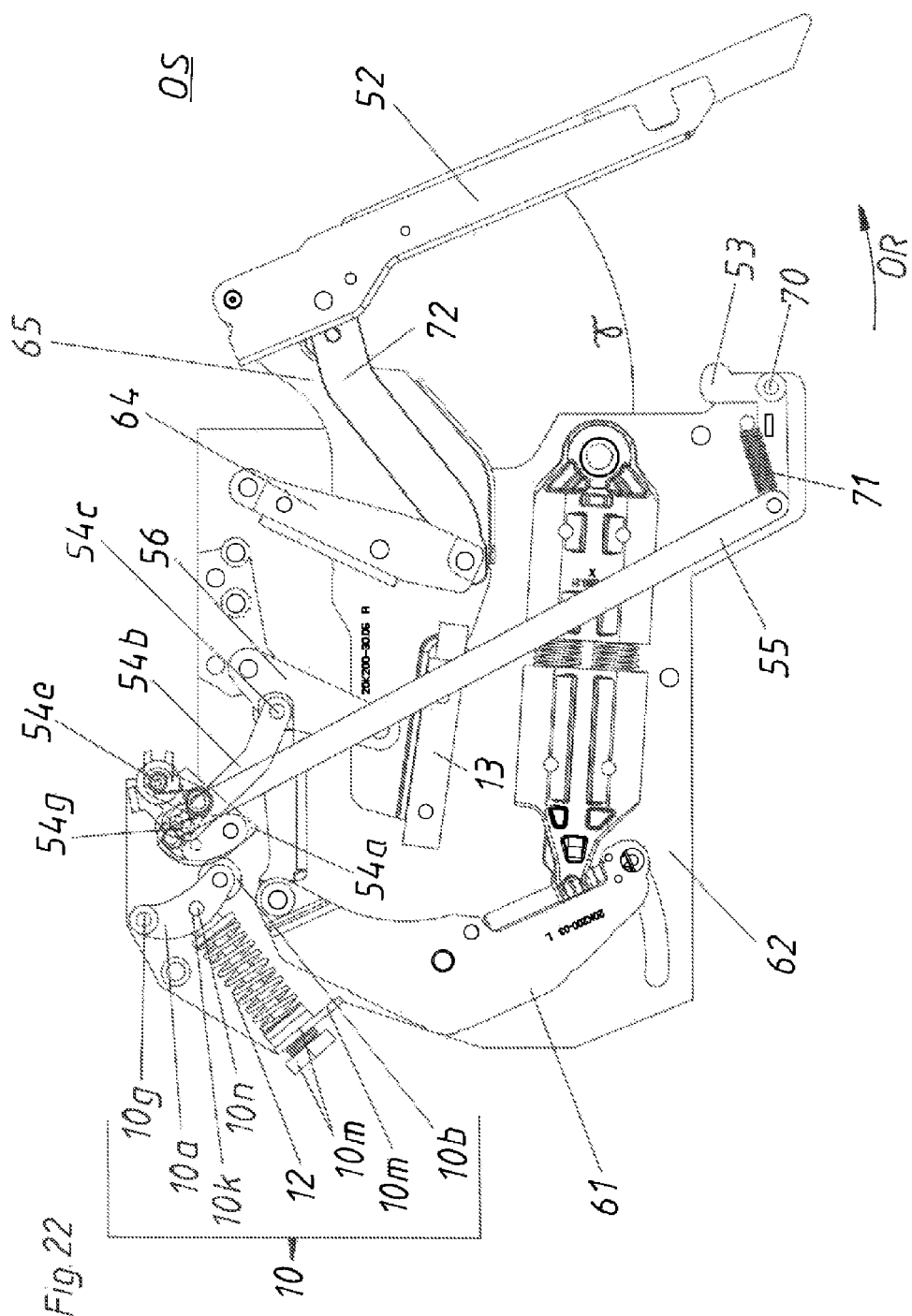
Figure 23:
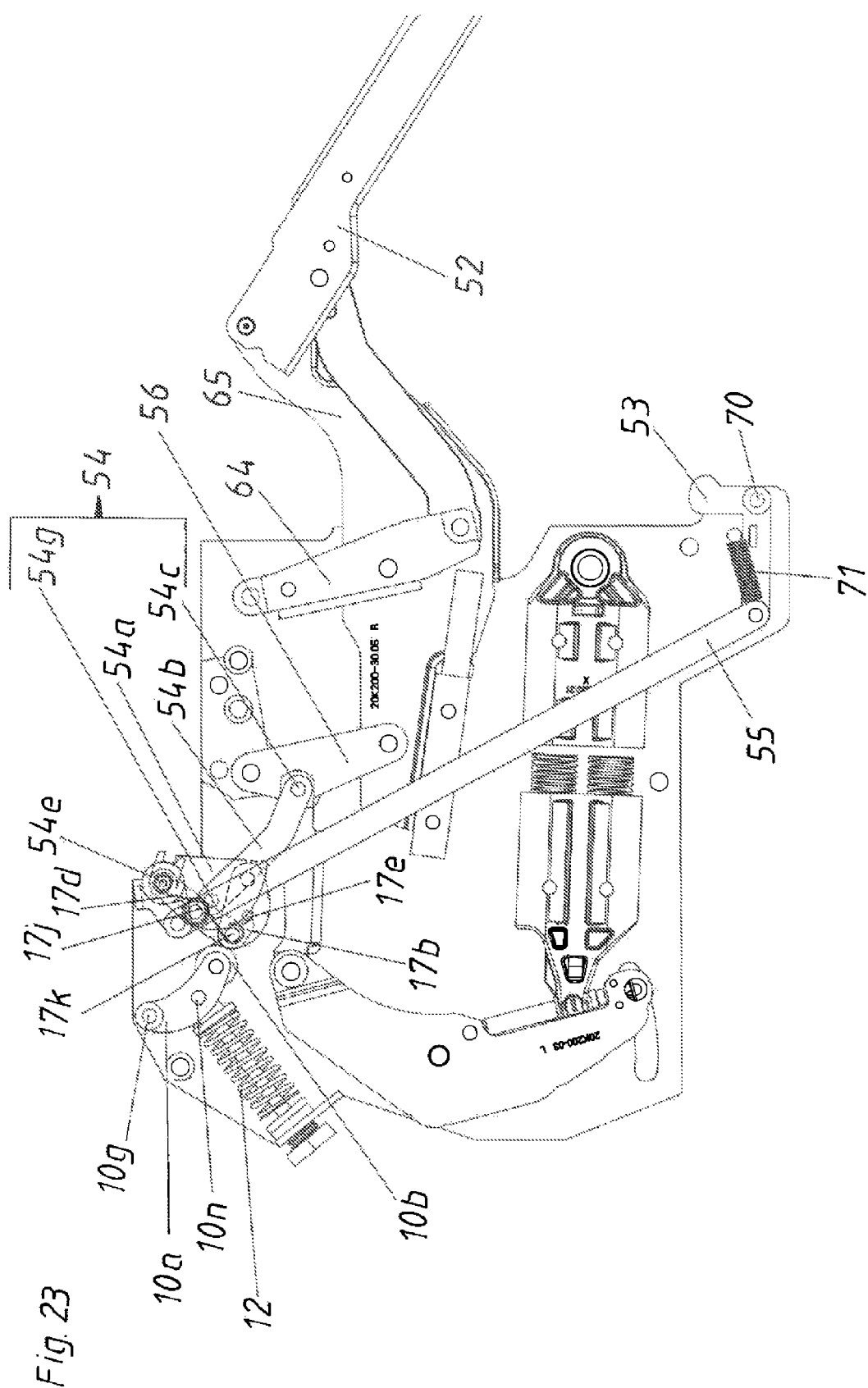
Figure 24:
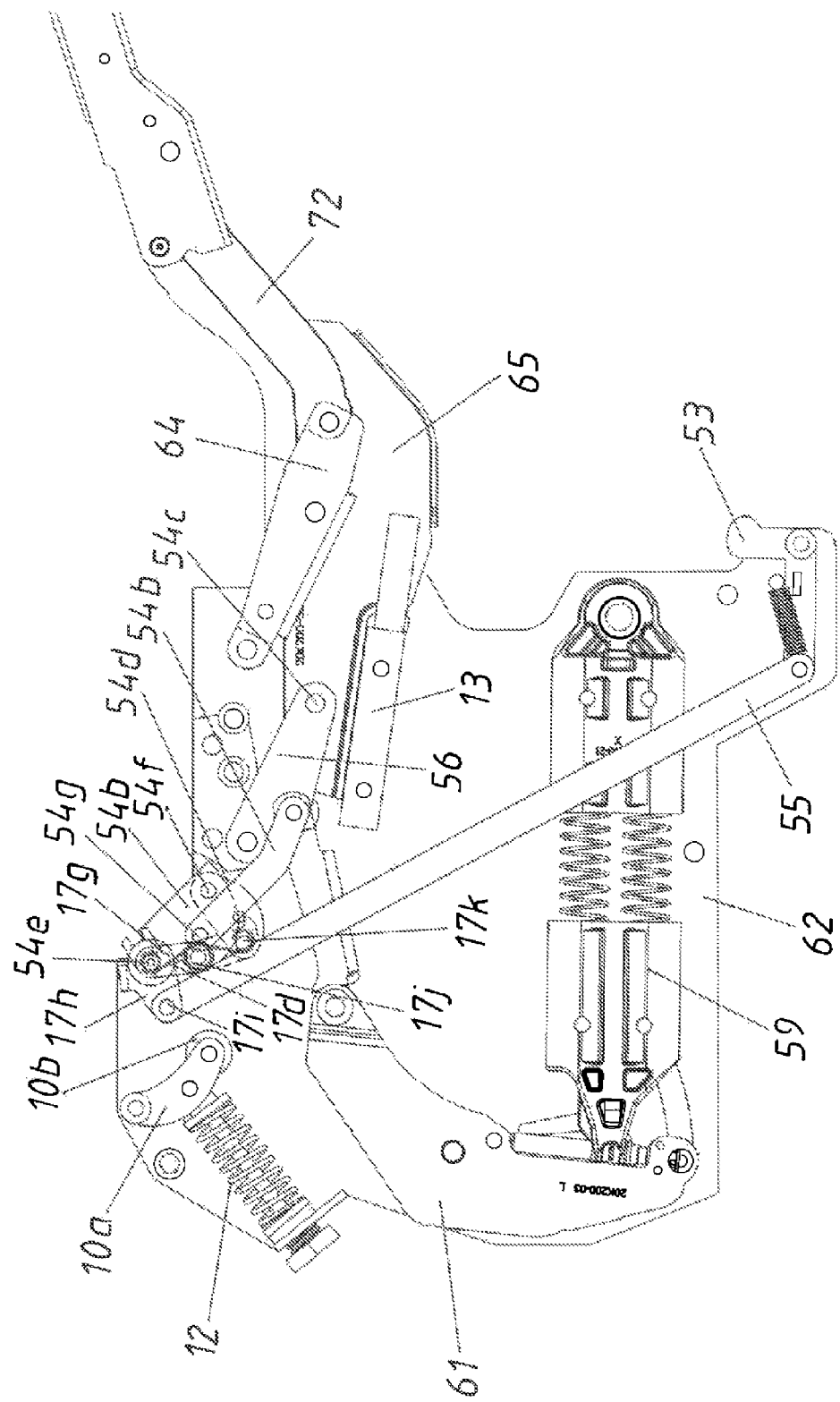

As a result the open position OS is reached as shown in FIG. 22, in which the control arm 52 is shown with the opening angle γ. That opening movement is effected by the connecting lever 54*b* being moved with the pivotal movement of the lever 54*a* and triggering pivotal movement of the element 56 of the lever mechanism 57. Due to that pivotal movement of the element 56, as a further consequence the lever 65 of the lever mechanism 57 is moved towards the right and the control arm 52 together with the furniture flap opens. In the FIG. 22 view the main spring 59 is already somewhat relieved of stress in comparison with the view in FIG. 21. The ejection movement involves moving beyond the dead point in the main mechanism (control arm arrangement with main spring 59). The damping device 13 no longer bears against the lever 72 of the lever mechanism 57. By virtue of the return spring 71 the transmission mechanism 55 has pivoted about the pivot axis 70 again whereby the trigger element 53 like also the unlocking element 17*h* was moved into the starting position again (as in FIG. 19). In FIG. 22 the parts denoted by references 10*a*, 10*b*, 10*g*, 10*k*, 10*m*, 10*n* and 12 form the drive device 10 which can function as an ejection device 8 and also as a retraction device 9.

After the spring 12 has been completely relieved of stress (as in FIG. 22) the furniture flap is further moved by hand in the opening direction OR. As in that further movement no spring force F now acts by the spring 12 on the stressing cam 54*d* by way of the ejection lever 10*a* and its pressure roller 10*b* the locking spring 17*d* can relieved of stress and urges the articulated lever into the position shown in FIG. 23. In that case the articulated lever pin 17*j* is again above the notional line between the ejection pivot axis 54*e* and the holding nose pin 17*k* and the holding nose 17*b* bears against the locking projection 17*e*.

If now the furniture flap is further moved in the opening direction OR (see FIG. 24) the stressing cam 54*d* comes out of engagement with the pressure roller 10*b* and the completely open position is reached.

Figure 25:
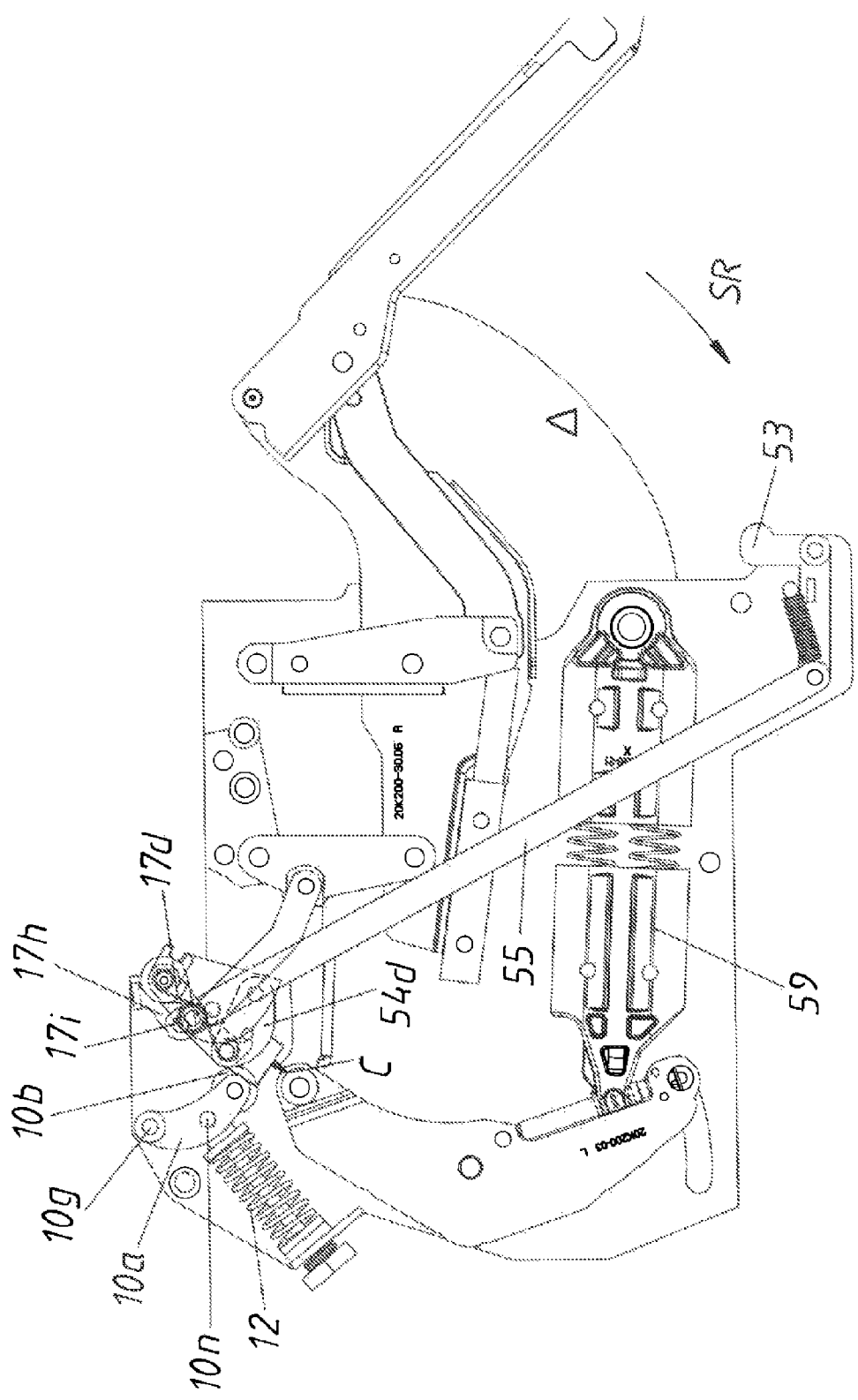
Figure 26:
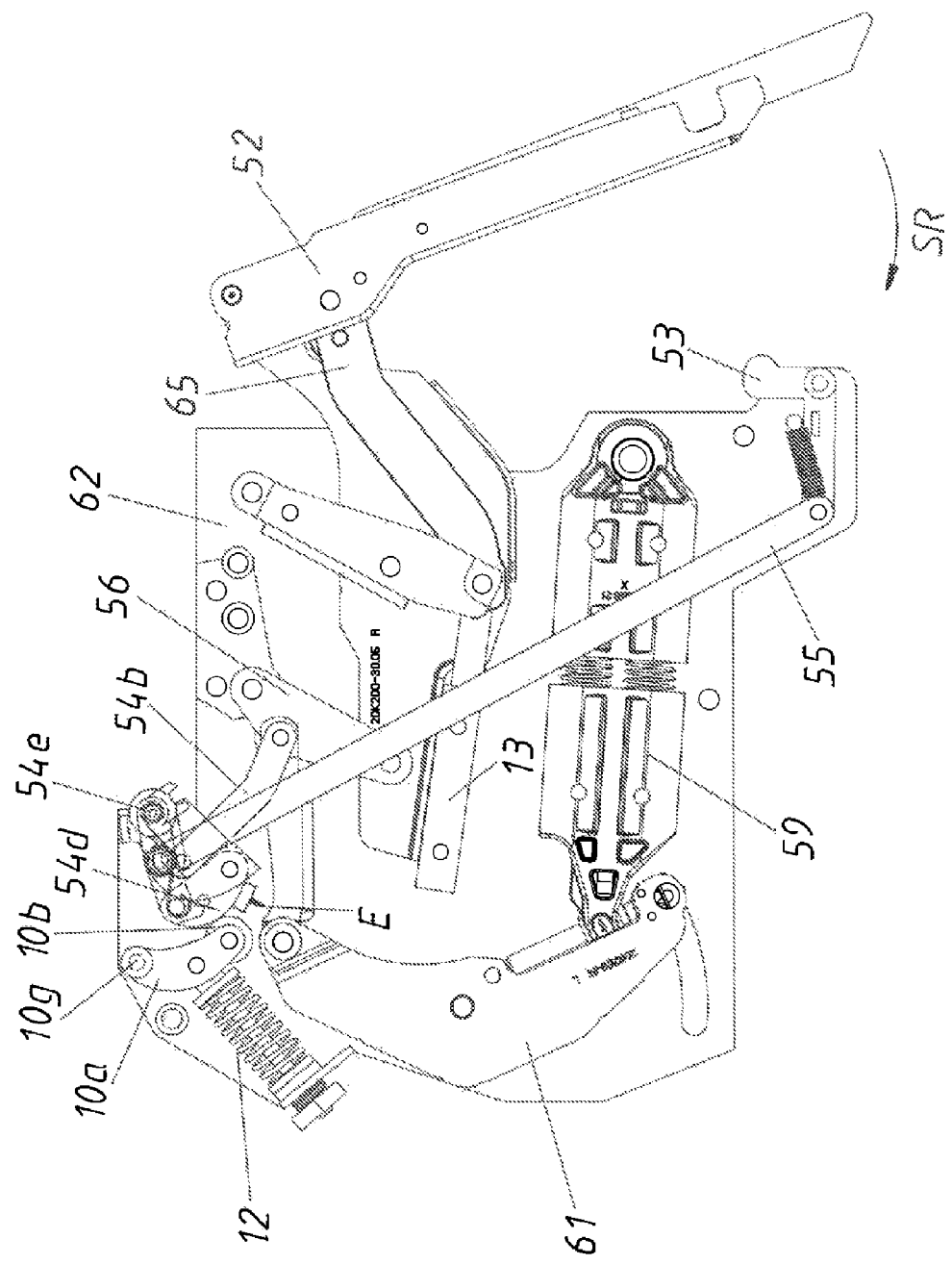

In FIG. 25 the movable furniture part 11 (furniture flap) is moved in the closing direction SR, stressing of the spring 12 beginning in the opening angle region Δ. Stressing begins by the stressing cam 54*d* which is locked by the locking lever 17*a* and the holding nose 17*b* coming to bear against the pressure roller 10*b* by way of the stressing portion C and by the spring 12 being pushed in by way of the ejection lever 10*a* and thus stressed.

That stressing continues until the pressure roller 10*b* has reached the highest point on the stressing cam 54*d* and passes into the retraction portion E. Upon reaching that retraction portion E the spring 12 can be slightly relieved of stress (movement from FIG. 26 to FIG. 19) and thus actively pulls the movable furniture flap in, in the last closing portion. In other words, by virtue of moving beyond the high point of the stressing cam 54*d*, the connecting lever 54*b* is actively rotated in the clockwise direction about the ejection pivot axis 54*e* so that a retraction effect is applied to the control arm 52. It will be noted however that this relief of stress takes place only until the pressure roller 10*b* passes into the depression between the stressing cam 54*d* and the connecting lever 54*b*. The closed position SS shown in FIG. 19 is reached again in that way. In the retraction movement the damping device 13 can also permit slight damping of the retraction movement triggered by the spring 12.

A synchronization bar can be fixed in the region of the ejection pivot axis 54*e* to transmit the rotary movement to a preferably mirror-symmetrical lever mechanism on another side of the furniture carcass 26.

A fourth embodiment of the present invention is shown in FIGS. 27 through 35. These purely diagrammatically show the sequence of movements in a drive device 10 upon closure, retraction and ejection of a movable furniture part 11. In all the Figures, of the movable furniture part 11, only the entrainment member 44 associated with that movable furniture part 11 is shown.

FIG. 27 shows that entrainment member 44 upon closure of the movable furniture part at the moment at which it butts against the locking element 17. The locking element 17 is mounted movably to the furniture carcass 26. Disposed on the locking element 17 is a control element 16 which moves in a locking and unlocking path 19. The locking and unlocking path 19 has a cardioid-shaped portion 18. The locking and unlocking path 19 is stationary relative to the furniture carcass 26. The locking element 17 is connected at one end to the spring 12 (tension spring). That spring in turn is connected by way of a damping device 13 (rotational damper with rack and gear), wherein that rotational damper is connected at one end to a locking slider 46. The locking slider 46 is held in a holding path 47 or displaceable therein in accordance with its respective position, by way of the locking projections 45 and 48. The holding path 47 is stationary relative to the furniture carcass 26.

If now the movable furniture part 11 and therewith the entrainment member 44 is moved from the position in FIG. 27 into the position in FIG. 28 in the closing direction SR the spring 12 is stressed or loaded.

Upon further movement in the closing direction (FIG. 29) the control element 16 is deflected by the locking and unlocking path 19 and the control element 16 moves into the locked position (FIG. 30) in the cardioid-shaped portion 18 of the locking and unlocking path 19. While the control element 16 passes into the locking position the entrainment member 44 comes out of engagement with the locking element 17 and passes between the catch elements 49 of the locking slider 46. As the movable furniture part 11 and thus the entrainment member 44 are further moved in the closing direction SR the locking slider 46 (in particular its first locking projection 45) is moved out of the locking position in the holding path 47

(see FIG. 29) into an unlocked position (see FIG. 30). By virtue of that unlocking the right-hand end of the spring 12 is no longer locked by the locking slider 46 and the spring 12 can contract whereby the spring 12 moves/retracts the entrainment member 44 and thus the movable furniture part from the position shown in FIG. 30 into the closed position SS in FIG. 31. Thus in that region the drive device 10 functions as a retraction device 9 and the spring 12 has a retracting action during its first part of the relief travel EW1. The retraction movement of the spring 12 is damped by the damping device 13.

That retraction movement is effected until the locking slider 46 and its second locking projection 48 has reached the locking position in FIG. 31. In that position the entrainment member 44 is still caught between the catch elements 49 but at the same time bears against the left-hand limiting abutment 50 of the locking element 17.

If now as shown in FIG. 32 pressure is further applied to the movable furniture part in the closing direction SR when in the closed position SS triggering of the drive device 10 takes place. By virtue of movement of the entrainment member 44 because of the application of increased pressure applied to the movable furniture part towards the left the limiting abutment 50 and therewith the locking element 17 are moved towards the left. As a result on the one hand the control element 16 moves out of the cardioid-shaped portion 18 into its free-running region of the locking and unlocking path 19. On the other hand the locking slider 46 also moves into a position in which the entrainment member 44 is released—in this case by pivotal movement as a consequence of a suitable design configuration of the holding path 47—.

By virtue of relief of the spring 12 the locking element 17 and by way of its limiting abutment 50 the entrainment member 44 and thus the movable furniture part 11 are actively ejected and reach the position shown in FIG. 33. In that region therefore the drive device 10 serves as an ejection device 8 whereby the spring force F serves for ejection of the movable furniture part 11 in the second part of the relief travel EW2.

After the entrainment member 44 has reached the position shown in FIG. 33 the spring 12 is completely relieved of stress and the movable furniture part 11 can be further moved in the opening direction OR by hand.

As soon as the entrainment member 44, in that movement, reaches the right-hand limiting abutment 50a of the locking element 17 (see FIG. 34) the damping device 13 is stressed and the locking slider 46 reaches the locked position shown in FIG. 35. The configuration of the holding path 47 and the locking slider 46 is only diagrammatically shown in the views, but can be provided by a man skilled in the art in the field of furniture drives with suitable pivotal paths or locking portions. From the right-hand limiting abutment 50a the entrainment member 44 can pass onto the right-hand side of the locking element 17 by downwardly pressing the locking element 17 (similarly to FIG. 29) by virtue of an inclined deflection portion or by suitable force applications, whereby the starting position shown in FIG. 27 is reached again.

In principle it should be stated in relation to this fourth embodiment that the drive device 10 could also be associated with the movable furniture part 11 and in contrast the entrainment member 44 could be associated with the furniture carcass 26. The damping device 13 does not have to be in the form of a rotational damper but for example can also be in the form of a fluid damper. The damping device 13 however can also be omitted whereby the spring force F of the spring 12 acts undampedly on the movable furniture part 11.

Thus all embodiments of the present invention present a drive device 10 which is substantially improved and simplified over the state of the art and which is both in the form of an ejection device 8 and also a retraction device 9, wherein the same spring 12 functions as a respective force storage means for retraction and ejection. It will be appreciated that the possibility should not be ruled out that two springs 12, 12a which are parallel or which also act in different directions on the drive element 20 are provided in the drive device 10. What is essential is that this at least one spring 12 serves for retraction during a part of its relief travel EW1 and serves for ejection during a further part of the spring relief travel EW2. The possibility should also not be ruled out that—depending on the respective configuration—the spring relief travel EW1 from the highest spring stress 7 to the medium spring stress 1 serves for ejection while further stress relief EW2 from the medium spring stress 1 to the relieved spring stress 3 serves for retraction.

The invention claimed is:

1. A drive device for moving a movable furniture part, wherein the drive device comprises a spring arranged such that the drive device acts
    as a lockable and unlockable spring-loaded ejection device for ejecting the furniture part from a closed position in an opening direction into a first open position, wherein the ejecting of the furniture part starts with the furniture part being in the closed position, and
    as a spring-loaded retraction device for retracting the furniture part from a second open position in a closing direction into the closed position,
    wherein the spring spring-loads the drive device both in its function as an ejection device and also in its function as a retraction device,
    wherein the spring has a relief travel,
    wherein between the second open position and the closed position the spring passes a first part of the relief travel in which the spring retracts the movable furniture part, the first part of the relief travel corresponding with a retraction spacing of the travel of the movable furniture part from the second open position in the closing direction into the closed position,
    wherein starting from the closed position and between the closed position and the first open position the spring passes a second part of the relief travel in which the spring ejects the movable furniture part, the second part of the relief travel corresponding with an ejection spacing of the travel of the movable furniture part from the closed position in the opening direction into the first open position,
    wherein the retraction spacing of the travel of the movable furniture part in the closing direction and the ejection spacing of the travel of the movable furniture part in the opening direction at least partly overlap,
    and wherein in a state in which the drive device is locked with the movable furniture part being in the closed position, unlocking of the drive device is triggered by applying pressure to the movable furniture part in the closing direction.

2. The drive device according to claim 1, wherein the spring can be stressed along a stressing travel upon opening or closing of the movable furniture part.

3. The drive device according to claim 2, wherein
    the spring in the closed position of the furniture part has a first medium spring stress between the first part of the relief travel and the second part of the relief travel,
    after ejection of the furniture part and relief of stress along the second part of the relief travel the spring has a second, substantially relieved spring stress at a given ejection spacing after leaving the closed position, upon closure of the furniture part the spring is stressed along the stressing travel and at a given retraction spacing before reaching the closed position, reaches a third spring stress which is increased in relation to the first spring stress, and starting from the third spring stress with stress relief along the first part of the relief travel and automatic retraction of the furniture part, the spring is relieved into the first spring stress.

4. The drive device according to claim 3, wherein the retraction spacing is less than the ejection spacing.

5. The drive device according to claim 3, wherein the stressing travel is longer than the second part of the relief travel.

6. The drive device according to claim 3, wherein upon unlocking of the ejection device the spring has a fourth spring stress which is slightly increased in relation to the third spring stress.

7. The drive device according to claim 3, further comprising:
- a first base element and a second base element which are movable relative to each other in the opening direction and the closing direction, respectively, of the movable furniture part;
- a control element which is mounted movably on the first base element, the spring acting on the control element as a force storage means; and
- a locking element connected to the control element, wherein the control element is guided with the locking element in a portion of a locking and unlocking path,
- wherein a drive element for the second base element is arranged on the control element,
- wherein the second base element has a guide path for the drive element, and the guide path
  - has an ejection portion in which the second base element is movable relative to the first base element in the opening direction of the movable furniture part by the drive element,
  - has a free-running portion in which the drive element is freely movable in the opening direction,
  - has a stressing portion in which the drive element is movable in opposition to a spring force of the spring acting on the control element, and
  - has a retraction portion in which the drive element moves the second base element relative to the first base element in the closing direction of the movable furniture part with partial stress relief of the spring,
- wherein the ejection portion of the guide path, the locking element and the drive element with the spring forms the lockable and unlockable ejection device, and the retraction portion of the guide path with the drive element and the spring forms the retraction device,
- and wherein
  - the spring is relieved in the ejection portion from the first medium spring stress to the second spring stress,
  - the second spring stress remains substantially the same in the free-running portion,
  - the spring is stressed from the second spring stress to the increased third spring stress in the stressing portion, and
  - the spring is relieved from the third spring stress to the first spring stress in the retraction portion.

8. The drive device according to claim 1, wherein the spring is an individual spring or is formed by a spring pack.

9. The drive device according to claim 1, further comprising a damping device which damps the retraction movement of the drive device.

10. The drive device according to claim 1, further comprising:
- a first base element and a second base element which are movable relative to each other in the opening direction and the closing direction, respectively, of the movable furniture part;
- a control element which is mounted movably on the first base element, the spring acting on the control element as a force storage means; and
- a locking element connected to the control element, wherein the control element is guided with the locking element in a portion of a locking and unlocking path,
- wherein a drive element for the second base element is arranged on the control element,
- wherein the second base element has a guide path for the drive element, and the guide path
  - has an ejection portion in which the second base element is movable relative to the first base element in the opening direction of the movable furniture part by the drive element,
  - has a free-running portion in which the drive element is freely movable in the opening direction,
  - has a stressing portion in which the drive element is movable in opposition to a spring force of the spring acting on the control element, and
  - has a retraction portion in which the drive element moves the second base element relative to the first base element in the closing direction of the movable furniture part with partial stress relief of the spring,
- and wherein the ejection portion of the guide path, the locking element and the drive element with the spring forms the lockable and unlockable ejection device, and the retraction portion of the guide path with the drive element and the spring forms the retraction device.

11. The drive device according to claim 10, wherein the control element has a limiting projection which limits the movement of the control element between two abutments in the first base element.

12. The drive device according to claim 10, wherein the control element is mounted pivotably to the first base element.

13. The drive device according to claim 10, wherein the locking and unlocking path is provided in the first base element.

14. The drive device according to claim 10, wherein in the stressing portion, the guide path moves the drive element in opposition to the spring force of the spring upon closure of the movable furniture part.

15. The drive device according to claim 10, wherein the second base element has a movement switch which allows the opening movement of the drive element from the free-running portion into a further free-running portion and which guides the drive element from the further free-running portion into the stressing portion in the closing movement.

16. The drive device according to claim 15, wherein the movement switch is a spring-loaded movement switch.

17. The drive device according to claim 10, wherein the locking element is mounted pivotably to the control element.

18. The drive device according to claim 10, wherein the ejection portion extends substantially transversely relative to the opening direction, the free-running portion extends substantially in the opening direction, the stressing portion has at least region-wise an angle ($\alpha$) between 10° and 70° relative to the opening direction, and the retraction portion has at least region-wise an angle ($\beta$) between 130° and 170° relative to the opening direction.

19. The drive device according to claim 18, wherein at least one of the portions of the guide path extends at least partially in a curve.

20. The drive device according to claim 18, wherein the angle ($\alpha$) is between 20° and 50°.

21. The drive device according to claim 18, wherein the angle ($\beta$) is between 140° and 160°.

22. The drive device according to claim 10, wherein a transition between the stressing portion and the retraction portion corresponds to the retraction spacing and there the spring reaches the highest spring stress.

23. The drive device according to claim 10, wherein the stressing portion and the retraction portion are spaced from the free-running portion transversely relative to the opening direction, and wherein the greatest spacing of both the stressing and retraction portions relative to the free-running portion is at the given retraction spacing.

24. The drive device according to claim 10, wherein the first base element is associated with the movable furniture part and the second base element is associated with a furniture carcass on or in which the furniture part is movably mounted.

25. The drive device according to claim 24, wherein the locking element is formed integrally with the drive element.

26. The drive device according to claim 24, wherein the spring is in the form of a leg spring, and wherein a first leg of the leg spring acts on the first base element and a second leg of the leg spring acts on the control element.

27. The drive device according to claim 10, wherein the first base element is associated with a furniture carcass and the second base element is associated with the movable furniture part.

28. The drive device according to claim 27, wherein the control element has a limiting projection which limits the movement of the control element between two abutments in the first base element, and wherein the limiting projection forms the drive element.

29. The drive device according to claim 27, wherein the spring is in the form of a coil spring which is held with one end at the first base element and is fixed with the other end to the control element.

30. The drive device according to claim 10, wherein the portion of the locking and unlocking path in which the control element is guided with the locking element is a cardioid-shaped portion of the locking and unlocking path.

31. A drawer extension guide for a movable furniture part in the form of drawer with a drive device according to claim 1.

32. The drawer extension guide according to claim 31, further comprising:
a drawer rail;
a carcass rail; and
a first base element and a second base element which are movable relative to each other in the opening direction and the closing direction, respectively, of the movable furniture part,
wherein the first base element is arranged on the carcass rail and the second base element is arranged on the drawer rail.

33. An article of furniture comprising:
a furniture carcass;
a movable furniture part; and
the drive device according to claim 1.

34. The article of furniture according to claim 33, further comprising a first base element and a second base element which are movable relative to each other in the opening direction and the closing direction, respectively, of the movable furniture part,
wherein the first base element is arranged on the movable furniture part, and the second base element is arranged on the furniture carcass.

35. The article of furniture according to claim 34, further comprising a drawer extension guide which is fixed to the furniture carcass, the drawer extension guide having a carcass rail,
wherein the movable furniture part is a drawer, and the first base element is arranged on an underside of a bottom of the drawer,
and wherein the second base element is arranged on the carcass rail.

36. The article of furniture according to claim 33, further comprising a first base element and a second base element which are movable relative to each other in the opening direction and the closing direction, respectively, of the movable furniture part,
wherein the first base element is arranged on the furniture carcass, and the second base element is arranged on the movable furniture part.

37. The article of furniture according to claim 36, further comprising a drawer extension guide which is fixed to the furniture carcass, the drawer extension guide having a carcass rail and a drawer rail,
wherein the first base element is arranged on the carcass rail and the second base element is arranged on the drawer rail, the drawer rail being associated with the movable furniture part.

38. A drive device for moving a movable furniture part, wherein the drive device comprises a spring arranged such that the drive device acts
as a lockable and unlockable spring-loaded ejection device for ejecting the furniture part from a closed position in an opening direction into a first open position, and
as a spring-loaded retraction device for retracting the furniture part from a second open position in a closing direction into the closed position,
wherein the spring spring-loads the drive device both in its function as an ejection device and also in its function as a retraction device,
wherein the spring has a relief travel,
wherein between the second open position and the closed position the spring passes a first part of the relief travel in which the spring retracts the movable furniture part, the first part of the relief travel corresponding with a retraction spacing of the travel of the movable furniture part from the second open position in the closing direction into the closed position,
wherein starting from the closed position and between the closed position and the first open position the spring passes a second part of the relief travel in which the spring ejects the movable furniture part, the second part of the relief travel corresponding with an ejection spacing of the travel of the movable furniture part from the closed position in the opening direction into the first open position,
wherein the retraction spacing of the travel of the movable furniture part in the closing direction and the ejection spacing of the travel of the movable furniture part in the opening direction at least partly overlap in a part of the retraction spacing which borders the closed position and in a part of the ejection spacing which borders the closed position,
and wherein stress in the spring increases while retracting the movable furniture part in the closing direction.

39. A drive device for moving a movable furniture part, wherein the drive device comprises a spring arranged such that the drive device acts
- as a lockable and unlockable spring-loaded ejection device for ejecting the furniture part from a closed position in an opening direction, and
- as a spring-loaded retraction device for retracting the furniture part into the closed position,
- wherein the spring spring-loads the drive device both in its function as an ejection device and also in its function as a retraction device,
- wherein the drive device further comprises a locking element which, in a state in which the locking element is held against an abutment portion, locks the drive device so as to lock the movable furniture part in the closed position,
- and wherein the locking element is pivotably mounted such that, in the state in which the locking element is held against the abutment portion and the drive device is locked with the movable furniture part being in the closed position, a pressure applied to the movable furniture part in the closing direction moves the locking element away from the abutment portion so as to unlock the drive device.

* * * * *